(12) United States Patent
Yano et al.

(10) Patent No.: US 8,687,113 B2
(45) Date of Patent: Apr. 1, 2014

(54) IMAGE PICKUP APPARATUS EQUIPPED WITH HANDLE UNIT

(75) Inventors: Hiroshi Yano, Tokyo (JP); Takahiko Kano, Tokyo (JP)

(73) Assignee: Canon Kabushiki Kaisha (JP)

( * ) Notice: Subject to any disclaimer, the term of this patent is extended or adjusted under 35 U.S.C. 154(b) by 186 days.

(21) Appl. No.: 13/334,647

(22) Filed: Dec. 22, 2011

(65) Prior Publication Data

US 2012/0162503 A1 Jun. 28, 2012

(30) Foreign Application Priority Data

Dec. 22, 2010 (JP) ................................ 2010-285878
Sep. 29, 2011 (JP) ................................ 2011-214390

(51) Int. Cl.
*H04N 5/225* (2006.01)

(52) U.S. Cl.
USPC ............ 348/375; 396/420; 396/422; 348/376

(58) Field of Classification Search
None
See application file for complete search history.

(56) References Cited

U.S. PATENT DOCUMENTS 5,121,147 A * 6/1992 Wada et al. .................... 396/198
6,686,967 B1 * 2/2004 Yamamoto .................... 348/373

FOREIGN PATENT DOCUMENTS

JP 05-292367 A 5/1993

* cited by examiner

*Primary Examiner* — Twyler Haskins
*Assistant Examiner* — Angel L Garces-Rivera
(74) *Attorney, Agent, or Firm* — Rossi, Kimms & McDowell LLP

(57) ABSTRACT

An image pickup apparatus which has a small-sized removable handle unit easy to be handled and removed and prevents breakage of electrical contacts. The handle unit includes a handle-side connector having a handle-side connector terminal section, rear handle fixing members for mounting the handle unit to the main unit, a connector fixing plate for mounting the handle-side connector to the handle unit, and resilient members interposed between the handle-side connector and the connector fixing plate. The main unit includes a main unit-side connector having a second terminal section and a main unit-side fixing portion to which the rear handle fixing members are affixed. The handle-side connector and the main unit-side connector are connected such that the first terminal section and the second terminal section are electrically connected in a state of the rear handle fixing members being affixed to the main unit-side fixing portion.

6 Claims, 20 Drawing Sheets

IMAGE PICKUP APPARATUS EQUIPPED WITH HANDLE UNIT

BACKGROUND OF THE INVENTION

1. Field of the Invention

The present invention relates to an image pickup apparatus, and more particularly to electrical connection between a handle unit and a main unit of the image pickup apparatus equipped with the handle unit.

2. Description of the Related Art

In image pickup apparatuses, such as a video camera, large-sized image pickup apparatuses include a type equipped with a handle unit used for shooting and for carrying the image pickup apparatus, and image pickup apparatuses of this type include one configured such that only the handle unit is made removable, by taking into account accommodatability, operability, and like other properties of the apparatus. For example, there has been known an image pickup apparatus configured such that the handle unit is mechanically connected to two handle fixing portions of the image pickup apparatus main unit at respective front and rear locations, and one of the handle fixing portions also serves as an accessory mount (see. e.g. Japanese Patent Laid-Open Publication No. H05-292367). Further, there has also been known an image pickup apparatus configured such that a removable handle unit has operation switches and an audio terminal.

Conventionally, in such image pickup apparatuses, operation switches and like other components and the image pickup apparatus main unit are connected by externally exposed wires. Such a connection method can achieve firm and secure mechanical mounting of the handle unit. Further, the handle unit has not only the merit of facilitation of shooting from a low angle, but also the merit of improvement in transportability and accommodatability by making the handle unit removable from the apparatus main unit.

In the image pickup apparatus disclosed in Japanese Patent Laid-Open Publication No. H05-292367 has the aforementioned two handle fixing portions provided on the apparatus main unit and two mounts provided on the handle unit.

In this image pickup apparatus, the handle unit is positioned in vertical, horizontal, and rotational directions with respect to the apparatus main unit by the mounts, and at least one of the mounts is provided with a slider which is movable in the horizontal direction, whereby the handle unit is latched on the apparatus main unit in a front-rear direction. This makes it possible to fix the handle unit to the apparatus main unit in the front-rear, vertical, horizontal, and rotational directions in a state in which the handle unit is mounted to the apparatus main unit.

Further, in recent years, to improve operability during shooting from a low angle shot, many of image pickup apparatuses have operation switches, such as a zoom switch and a trigger switch, disposed on a handle unit thereof. In this case, since operation signals are transmitted and received between the handle unit and the apparatus main unit, it is necessary to electrically connect the handle unit to the apparatus main unit.

However, since the handle unit is generally held by hand during shooting and carrying of the image pickup apparatus, the above-described connection method suffers from a problem that a terminal-associated part, such as the accessory mount having electrical contacts or audio terminals, may receive so large a force that the terminal-associated part cannot withstand the load of the applied force, and be broken. Further, the image pickup apparatus which connects the electrical contacts by externally exposed wires has problems of inconvenience in wire handling, troublesomeness of mounting and removing the wires, an increase in the size of the image pickup apparatus due to the wires, and so forth.

Further, due to the locations of the electrical contacts in the handle unit, depending on a signal path of signals supplied from the handle unit to the apparatus main unit, within the main unit, an audio signal as a faint analog signal may be affected by noise, which may degrade signal quality.

SUMMARY OF THE INVENTION

The present invention provides an image pickup apparatus having a small-sized removable handle unit which is easy to be handled and removed, and is free from breakage of electrical contacts thereof.

Further, the present invention provides, for an image pickup apparatus that has a handle unit which can be mounted and removed to and from an apparatus main unit and has electrical contacts in the handle unit, a mechanism which can prevent an audio signal delivered from the handle unit from being degraded.

In a first aspect of the present invention, there is provided an image pickup apparatus including a main unit, and a handle unit which can be mounted and removed to and from the main unit, wherein the handle unit comprises a handle-side connector having a first terminal section for electrically connecting the handle unit and the main unit, a first fixing member for mounting the handle unit to the main unit, a second fixing member for mounting the handle-side connector to the handle unit, and a resilient member that is interposed between the handle-side connector and the second fixing member, and wherein the main unit comprises a main unit-side connector having a second terminal section which is electrically connected to the first terminal section of the handle-side connector, and a main unit-side fixing portion to which the first fixing member is affixed, and wherein the handle-side connector and the main unit-side connector are connected such that the first terminal section and the second terminal section are electrically connected in a state in which the first fixing member is affixed to the main unit-side fixing portion.

According to the first aspect of the present invention, in the image pickup apparatus that has the handle unit which can be mounted and removed to and from the apparatus main unit and has the electrical contacts, it is possible to reduce the size of the handle unit, and further, it is possible to facilitate handling and removal of the handle unit and prevent the electrical contacts from being broken.

In a second aspect of the present invention, there is provided an image pickup apparatus including an apparatus main unit, and a handle unit which can be mounted and removed to and from the apparatus main unit, comprising an audio signal processor disposed in a front portion of the apparatus main unit, a first main unit-side contact portion disposed in the front portion of the apparatus main unit, for connection to the audio signal processor, a operation-related signal processor disposed in a rear portion of the apparatus main unit, a second main unit-side contact portion disposed in the rear portion of the apparatus main unit, for connection to the manipulation-related system signal processor, a first handle-side contact portion disposed in the front portion of the handle unit, for connection to a handle-side microphone, a handle-side operating section disposed in a rear portion of the handle unit, and a second handle-side contact portion disposed in the rear portion of the handle unit, for connection to the handle-side operating section, wherein when the handle unit is mounted to the apparatus main unit, the first handle-side contact portion and the first main unit-side contact portion are electrically connected to each other, and the second handle-side contact portion and the second main unit-side contact portion are electrically connected to each other.

According to the second aspect of the present invention, in the image pickup apparatus that has the handle unit which can be mounted and removed to and from the apparatus main unit and has electrical contacts in the handle unit, it is possible to prevent an audio signal delivered from the handle unit from being degraded.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. In each of the embodiments described hereafter, a so-called digital video camera is specifically taken as an example of an image pickup apparatus, but the present invention is not limited to this.

Figure 1:
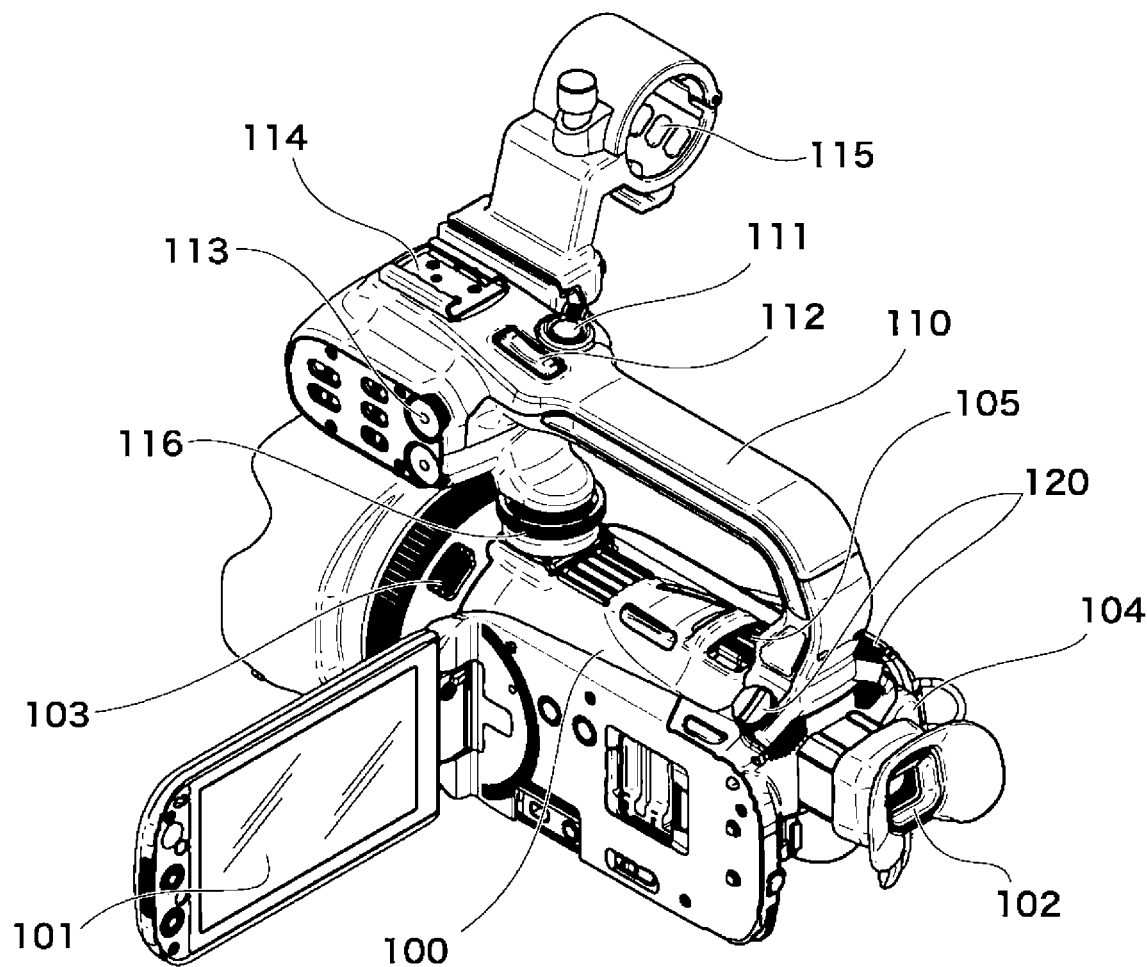
FIG. 1 is a perspective view of a digital video camera as an image pickup apparatus according to a first embodiment of the present invention.

FIG. 1 is a perspective view of the digital video camera as an image pickup apparatus according to a first embodiment of the present invention. The digital video camera as the image pickup apparatus according to the present embodiment has a configuration in which a handle unit 110 is removable from a main unit 100. The main unit 100 includes an image display unit 101, a finder unit 102, a sound pickup section 103, a trigger section 104, and a zoom key 105. Other sections and components included in the main unit 100 will be described hereinafter as required.

On the other hand, the handle unit 110 includes an operating section for transmitting an electrical signal for operating the main unit 100 to the main unit 100, and/or an input-output terminal for attaching an accessory that transmits or receives an electrical signal to or from the main unit 100. More specifically, the handle unit 110 includes the operating section including a handle trigger 111, a handle zoom section 112 comprising a zoom key, and a handle operation key unit 113, an external accessory mount 114, and an external terminal input section 117 (external microphone connectors) (see FIG. 4).

The handle unit 110 further includes an external microphone holder 115 for holding an external microphone, a front handle-fixing member 116, and rear handle fixing members 120 (first fixing member) for mounting the handle unit 110 to the main unit 100. Note that the digital video camera as the image pickup apparatus according to the present embodiment has a configuration in which the handle unit 110 is mounted and removed to and from the main unit 100 at front and rear locations using the front handle-fixing member 116 and the rear handle fixing members 120.

Figure 2:
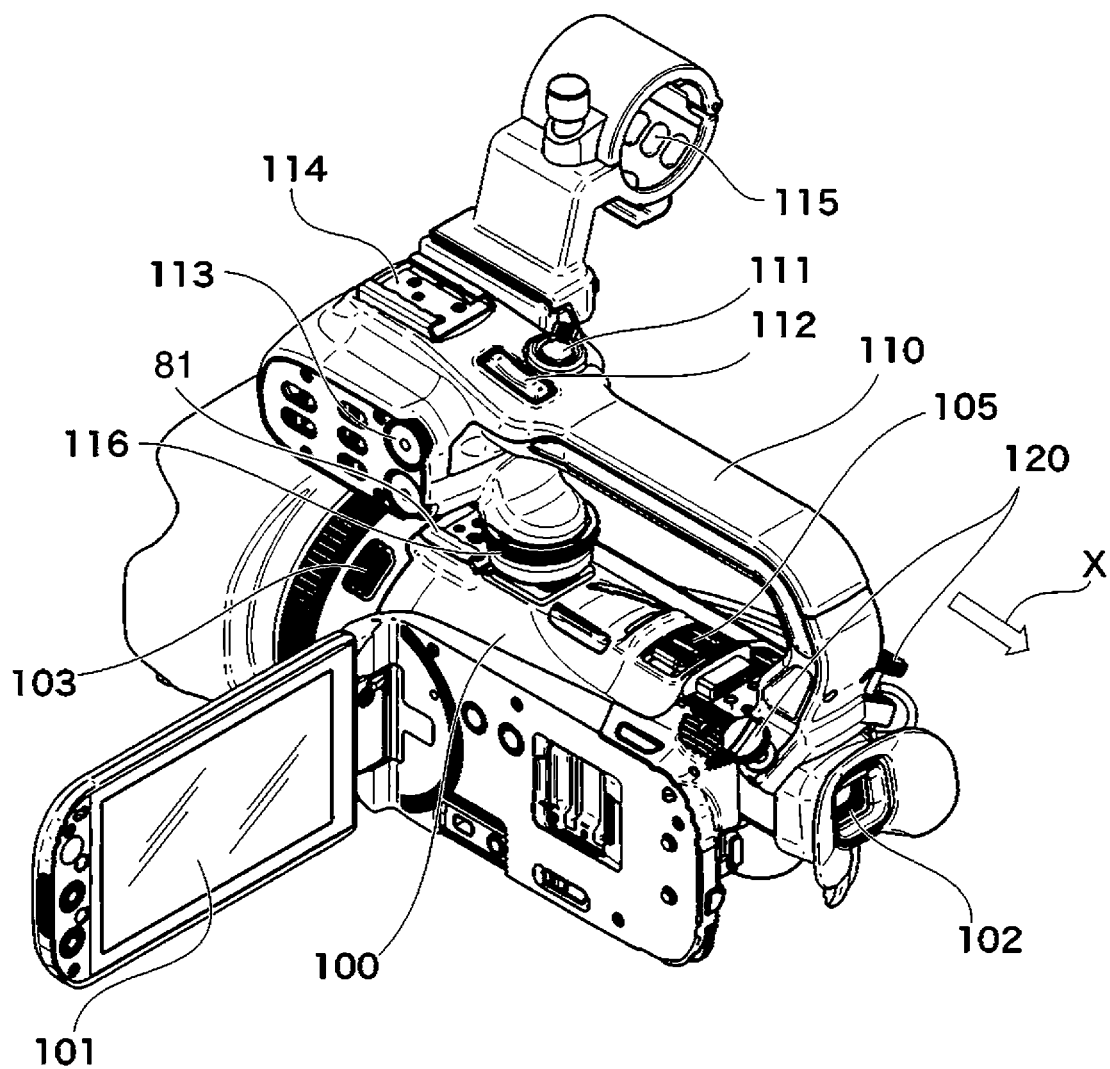
FIG. 2 is a perspective view of the digital video camera in a state in which a handle unit is removed from a main unit.
Figure 3:
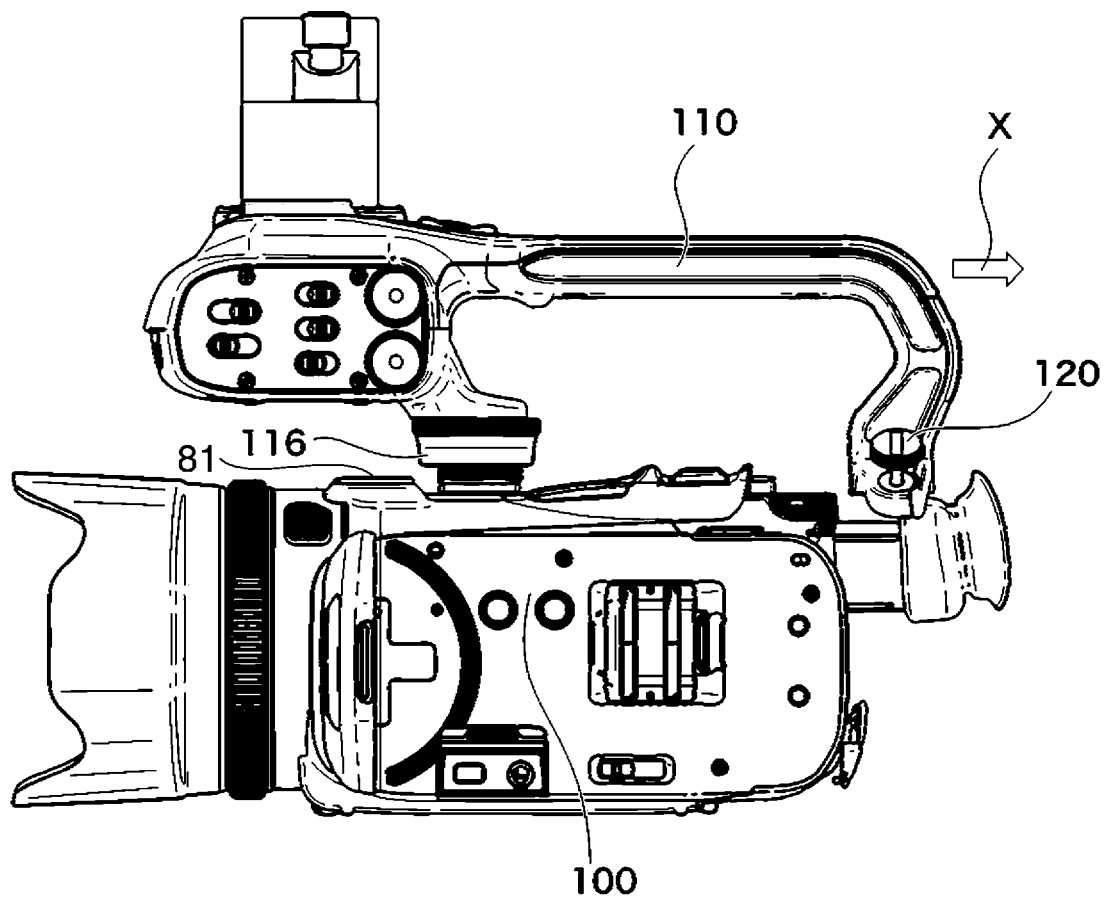
FIG. 3 is a side view of the digital video camera in the state in which the handle unit is removed from the main unit.

A perspective view in FIG. 2 and a side view in FIG. 3 show a state of the digital video camera in which the handle unit 110 is slid rearward and is removed from the main unit 100 of the image pickup apparatus shown in FIG. 1. As shown in FIGS. 2 and 3, in the present embodiment, in removing the handle unit 110 from the main unit 100, first, the front handle-fixing member 116 and the rear handle fixing members 120 provided on the handle unit 110 are each rotated in a loosening direction. This loosens the handle unit 110 from a state firmly and securely mounted to the main unit 100. By sliding the handle unit 110 with respect to the main unit 100 in this state in a direction indicated by an arrow X, i.e. rearward in an optical axis direction of the main unit 100, the handle unit 110 can be removed from the main unit 100. Note that to mount the handle unit 110 to the main unit 100, it is only required to perform the above-described operations in reverse order to removing.

Figure 4:
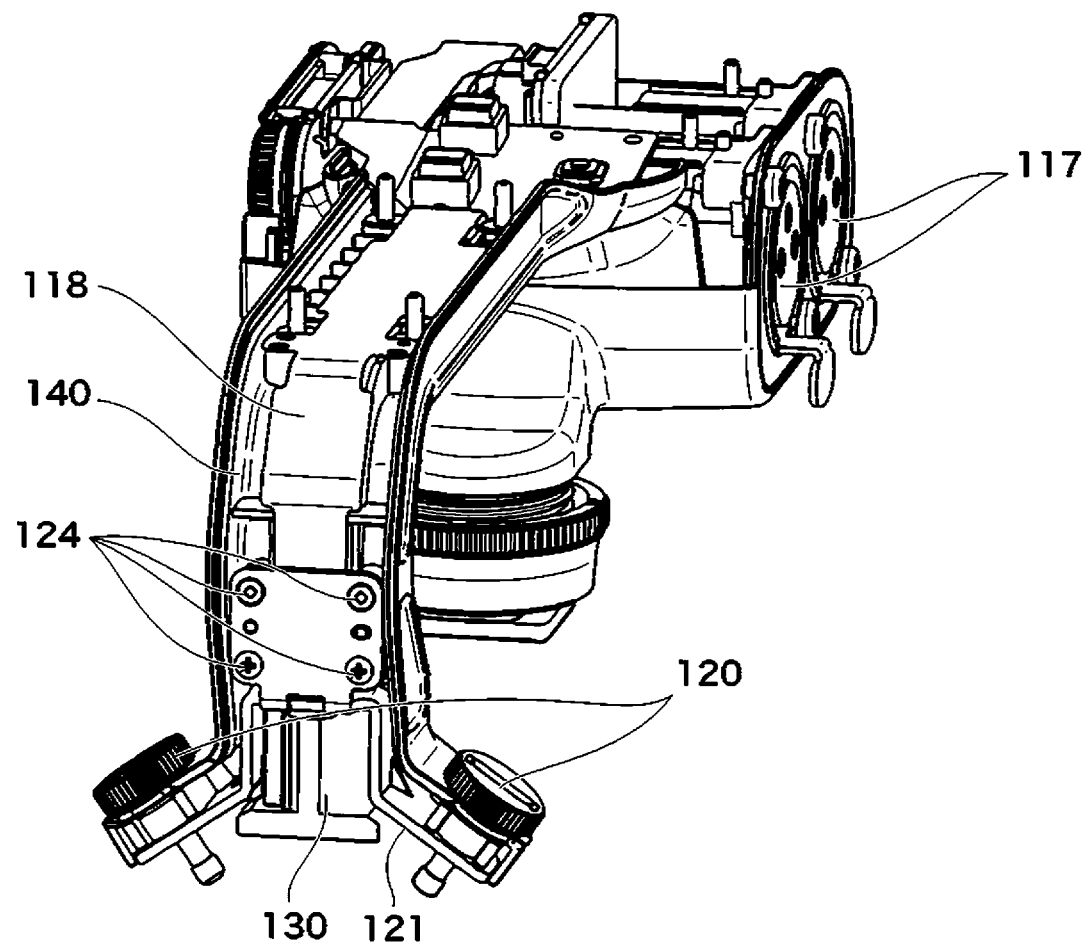
FIG. 4 is a perspective view of an internal structure of the handle unit.

FIG. 4 is a perspective view of an internal structure of the handle unit 110. The above-mentioned handle trigger 111, handle zoom section 112, handle operation key unit 113, and external terminal input section 117, which are included in the handle unit 110, are parts which exchange electrical signals with the main unit 100. These parts are electrically connected to a handle-side connector terminal section 130b, as a first terminal section, provided in a handle-side connector 130 of the handle unit 110 through an electrical signal transmission line 118 provided within a frame of the handle unit 110.

The electrical signal transmission line 118 is e.g. a flexible printed wiring substrate, and the electrical signal transmission line 118 is not exposed to the outside of the handle unit 110. Therefore, there is no conventional troublesome operation, such as handling of an externally exposed wire, for electrical connection between the main unit 100 and the handle unit 110.

As shown in FIG. 4, a connector fixing plate 121 (second fixing member) is fixed with screws 124 to a handle unit lower cover 140 forming the frame of the handle unit 110.

Figure 5:
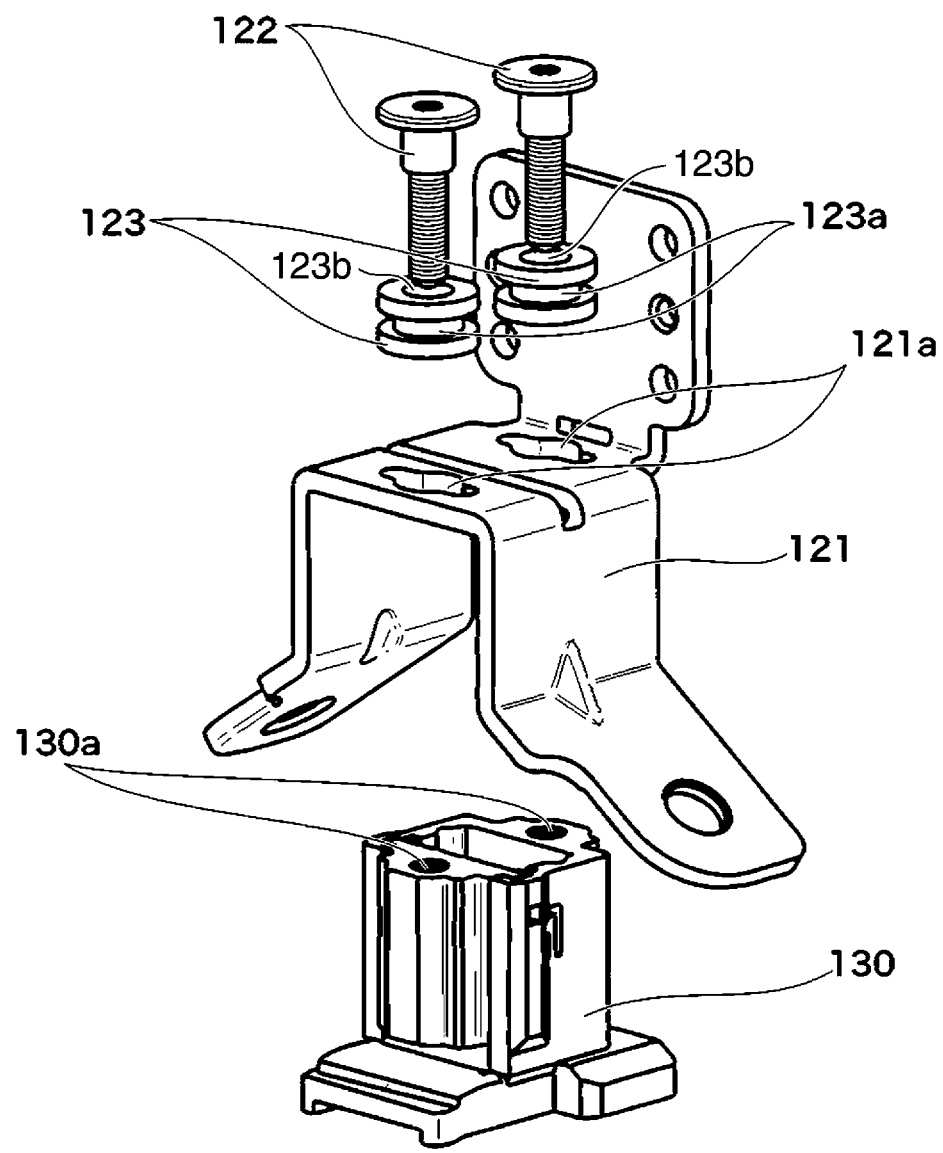
FIG. 5 is an exploded perspective view of part of the handle unit.

FIG. 5 is an exploded perspective view of part of the handle unit 110. The connector fixing plate 121 is formed with holes 121a for inserting shoulder screws 122 therethrough. Further, a resilient member 123 formed e.g. of rubber is fitted in each hole 121a. The resilient member 123 has a narrow portion 123a formed for mounting the resilient member 123 in each hole 121a, and the narrow portion 123a is fitted in each hole 121a. The resilient member 123 has a substantially annular shape which also has a hole 123b for allowing insertion of the shoulder screw 122 therethrough.

The handle-side connector 130 is formed with screw holes 130a in which the shoulder screws 122 are inserted and fitted. The shoulder screws 122 are inserted through the holes 123b of the resilient members 123 mounted in the respective holes 121a formed in the connector fixing plate 121, and then are screwed into the respective screw holes 130a formed in the handle-side connector. As a result, the handle-side connector 130 is mounted to the connector fixing plate 121, and in turn is mounted to the handle unit 110.

Figure 6:
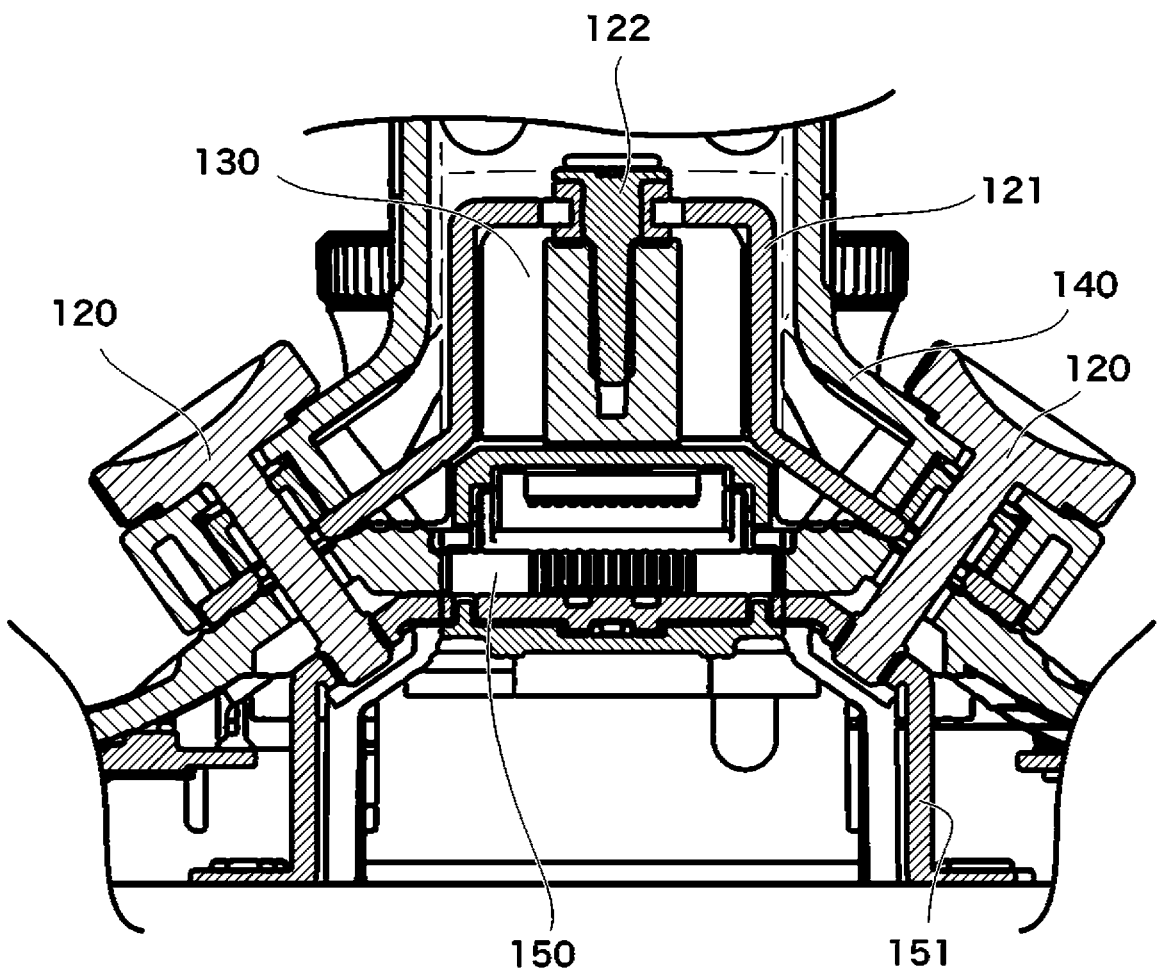
FIG. 6 is a cross-sectional view of a rear portion of the handle unit in a state in which the handle unit is mounted to the main unit of the digital video camera.
Figure 7:
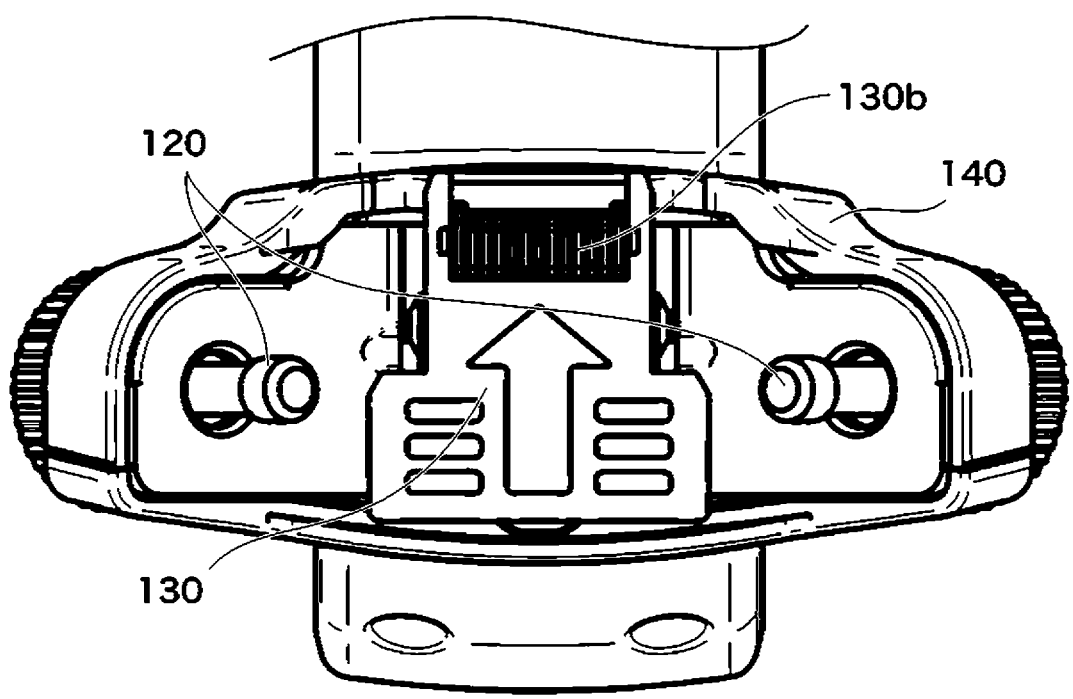
FIG. 7 is a view of the rear portion of the handle unit in the state in which the handle unit is mounted to the main unit of the digital video camera, as viewed from the bottom.
Figure 8:
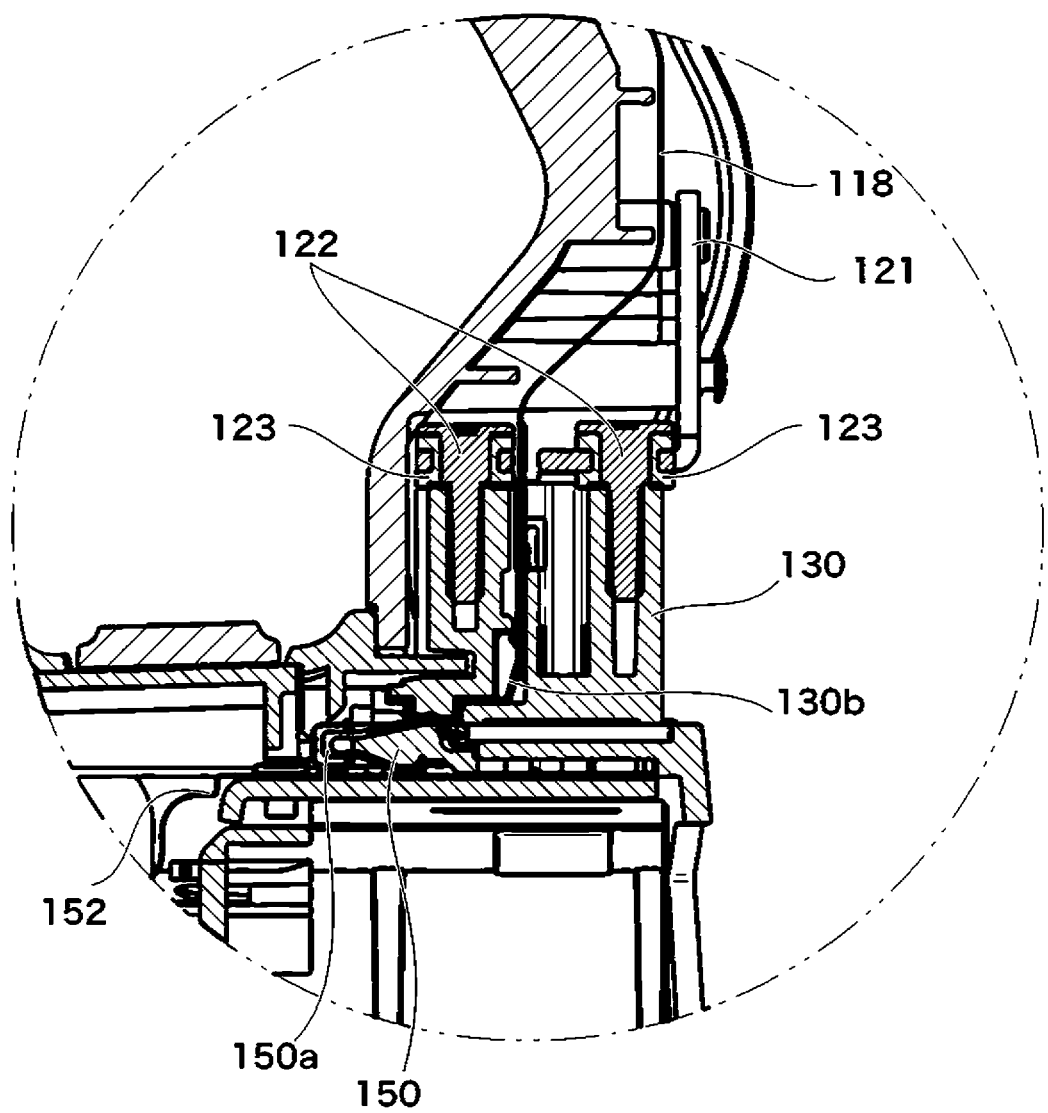
FIG. 8 is a cross-sectional view of another rear portion of the handle unit in the state in which the handle unit is mounted to the main unit of the digital video camera.

FIG. 6 is a cross-sectional view of a rear portion (portion to which the rear handle fixing members 120 are disposed) of the handle unit 110 in a state in which the handle unit 110 is mounted to the main unit 100. FIG. 7 is a view of the rear portion of the handle unit 110 in the state in which the handle unit 110 is mounted to the main unit 100, as viewed from the bottom. FIG. 8 is a cross-sectional view of another rear portion of the handle unit 110 in the state in which the handle unit 110 is mounted to the main unit 100, which shows how the main unit 100 and the handle unit 110 are electrically connected to each other.

In the image pickup apparatus according to the present embodiment, the rear handle fixing members 120 are screwed to a main unit-side fixing portion 151 provided within the main unit 100, whereby the handle unit lower cover 140 and the connector fixing plate 121 of the handle unit 110 are fastened to the main unit 100. As a result, the handle unit 110 is mounted and fixed to the main unit 100.

As shown in FIG. 6, in a state of the handle unit 110 fixed to the main unit 100, the handle-side connector 130 is in contact with a main unit-side connector 150 provided in the main unit 100. At this time, as shown in FIG. 8, the handle-side connector terminal section 130b disposed in the handle-side connector 130 and a main unit-side connector terminal section 150a as a second terminal section disposed in the main unit-side connector 150 are electrically connected.

Here, as mentioned above, since the handle-side connector 130 is mounted to the connector fixing plate 121 with the resilient members 123 interposed therebetween, the handle-side connector 130 is allowed to move relative to the connector fixing plate 121 to a limit permitted by deformation of the resilient members 123. Therefore, preferably, when the handle unit 110 is in the state mounted to the main unit 100, the handle-side connector 130 is in a state pressed against the main unit 100 by deformation of the resilient members 123. This makes it possible to enhance the reliability of electrical connection between the handle-side connector terminal section 130b and the main unit-side connector terminal section 150a.

In the present embodiment, the rear handle fixing members 120 are unconditionally positioned with respect to the main unit-side fixing portion 151, and are made difficult to suffer from misregistration by screwing. Further, the handle unit 110 is mounted to the main unit 100 using a plurality of rear handle fixing members 120 (two in the present embodiment). Furthermore, as shown in FIG. 7, the handle-side connector 130 is disposed between the two rear handle fixing members 120. The arrangement described above makes it possible to prevent misregistration of the handle-side connector 130 and stably hold the handle-side connector 130, which in turn makes it possible to enhance the reliability of electrical contact between the handle-side connector 130 and the main unit-side connector 150.

Figure 9:
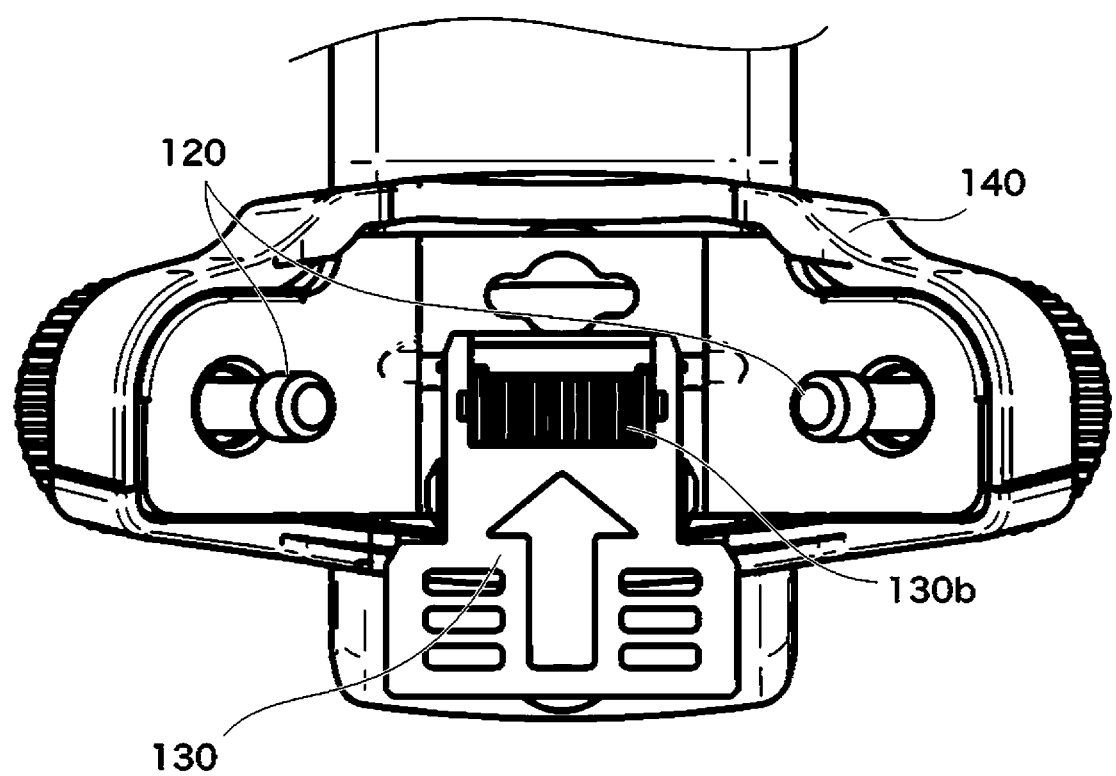
FIG. 9 is a view of a variation of a structure for mounting the handle unit to the main unit of the digital video camera, as viewed from the bottom of a rear portion of the handle unit.

FIG. 9 is a view of a variation of a structure for mounting the handle unit 110 to the main unit 100, as viewed from the bottom of the rear portion of the handle unit 110 similarly to FIG. 7. In the structure shown in FIG. 8, the handle-side connector 130 and the main unit-side connector 150 are arranged such that the handle-side connector terminal section 130b is located on a straight line connecting between the two rear handle fixing members 120. This make is possible to further enhance the reliability of electrical contact between the handle-side connector 130 and the main unit-side connector 150.

The transmission path of electrical signals between the main unit 100 and the handle unit 110 will be described with reference to FIG. 8. The handle trigger 111, the handle zoom section 112, the handle operation key unit 113, the external terminal input section 117, and so forth, which are provided in the handle unit 110, transmit electrical signals for operating the image pickup apparatus, to the main unit 100. These electrical signals are transmitted to the handle-side connector terminal section 130b within the handle-side connector 130 through the electrical signal transmission line 118 disposed within the frame of the handle unit 110. Then, the electrical signals are transferred from the handle-side connector terminal section 130b to the main unit-side connector terminal section 150a of the main unit-side connector 150, and are further transferred to a main unit substrate, not shown, through a main unit signal transmission section 152 within the main unit 100. With the above-described transmission path of the electrical signals, it is possible to exchange electrical signals between the handle unit 110 and the main unit 100.

As mentioned hereinabove, the handle-side connector 130 is allowed to move relative to the connector fixing plate 121 to the limit permitted by deformation of the resilient members 123. That is, the handle unit 110 and the main unit 100 are electrically connected to each other via the handle-side connector 130 which is movable to the limit permitted by deformation of the resilient members 123, and are mechanically firmly fixed by the rear handle fixing members 120. Therefore, in a case where too large a force is applied to the handle unit 110 in a state of the handle unit 110 being held by a user's hand or the like, the resilient members 123 can suppress force acting on the handle-side connector 130. Thus, the image pickup apparatus according to the present embodiment highly ensures the reliability of electrical connection between the main unit 100 and the handle unit 110 even when too large a force is applied to the handle unit 110, while ensuring the mounting strength of the handle unit 110 to the main unit 100.

Next, a description will be given of electrical circuits of the image pickup apparatus according to the first embodiment and signal paths between the electrical circuits.

Figure 10:
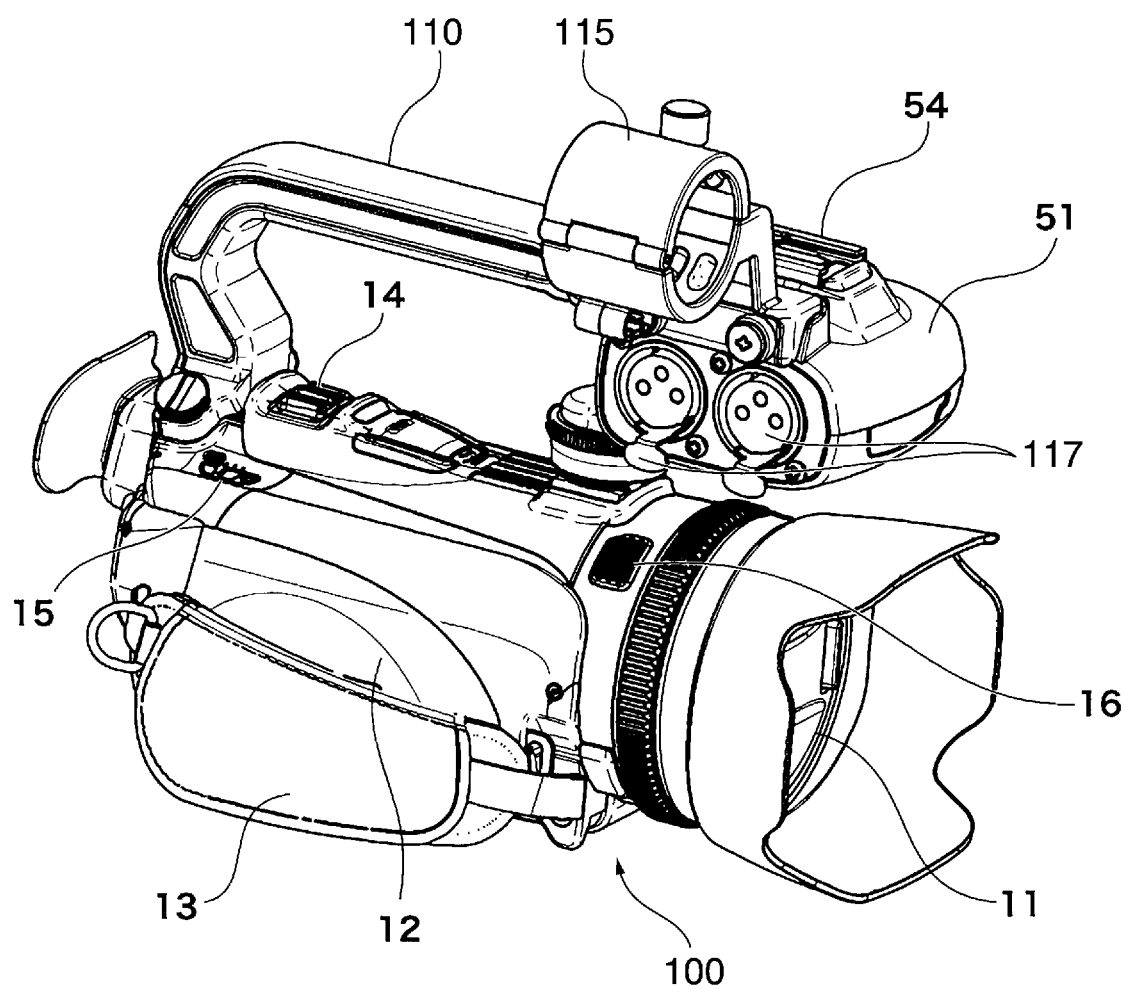
FIG. 10 is a perspective view of the digital video camera as the image pickup apparatus according to the first embodiment, as viewed from a laterally opposite side from FIG. 1.
Figure 11:
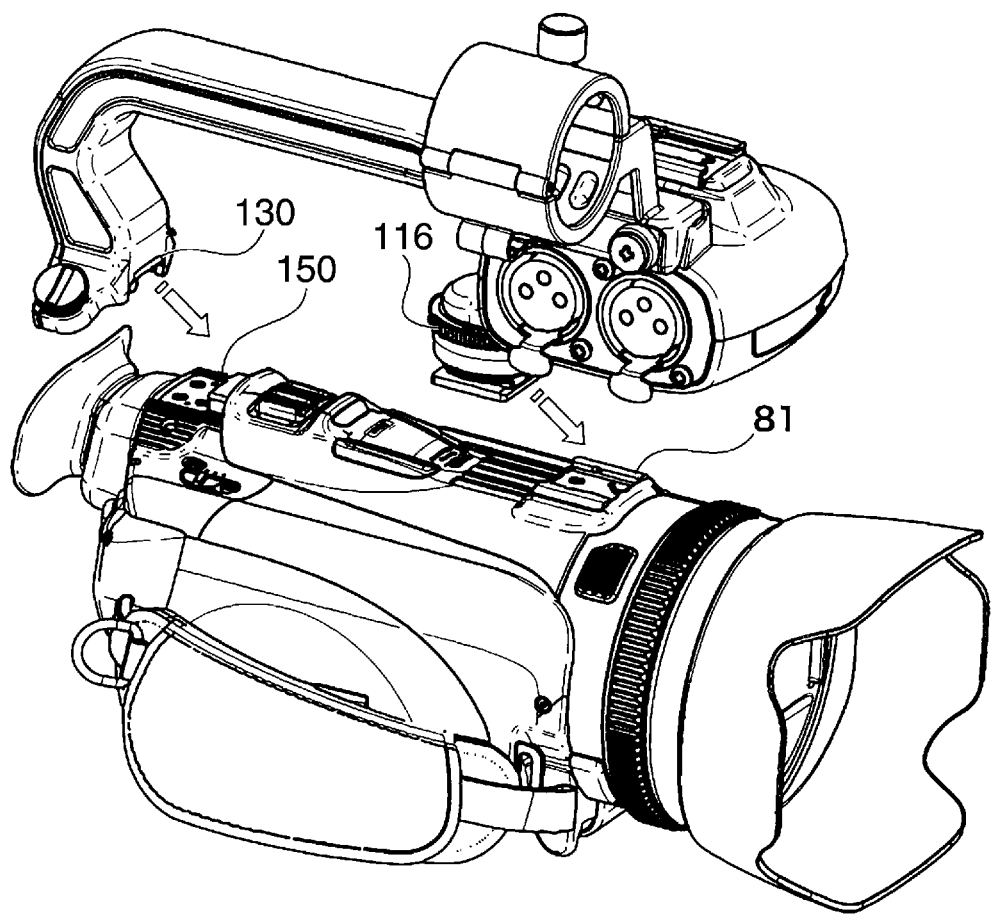
FIG. 11 is a perspective view of the digital video camera in a state in which the handle unit is removed from the camera main unit appearing in FIG. 10, as viewed from a laterally opposite side from FIG. 2.

FIGS. 10 and 11 are perspective views of the digital video camera, as viewed from a laterally opposite side from FIGS. 1 and 2, respectively, and FIG. 11 is the perspective view of the digital video camera in a state in which the handle unit is removed from the camera main unit appearing in FIG. 10.

As shown in FIG. 10, the main unit 100 has a photographic lens 11 disposed in a front portion thereof and has a grip belt 13 disposed on a right side thereof, as viewed from a photographer. The main unit 100 has a zoom switch 14, a mode switch 15, and an internal microphone 16 disposed in an upper portion thereof.

Further, the handle unit 110 is removably mounted to the upper portion of the main unit 100. The external microphone holder 115, the external microphone connectors 117 which are electrically connected to an external microphone mounted to the external microphone holder 115, and an accessory mount 54 are disposed in a front portion of the handle unit 110.

Further, as shown in FIG. 11, the upper portion of the main unit 100 is provided with a fixing portion 81 and the main unit-side connector 150 in a manner spaced from each other in a front-rear direction of the main unit 100. On the other hand, the handle unit 110 has the front handle-fixing member 116 disposed in the front portion thereof, and has the handle-side connector 130 disposed in the rear portion thereof.

When the handle unit 110 is slid from the FIG. 11 state in a direction indicated by an arrow in FIG. 11, and is mounted to the main unit 100, the front handle-fixing member 116 is engaged with the fixing portion 81, and at the same time the handle-side connector 130 is engaged with the main unit-side connector 150. As a result, the main unit 100 and the handle unit 110 are electrically connected to each other. Between the main unit-side connector 150 and the handle-side connector 13, there are transmitted and received mainly operation signals, an audio signal, power supply, and so forth.

Figure 12:
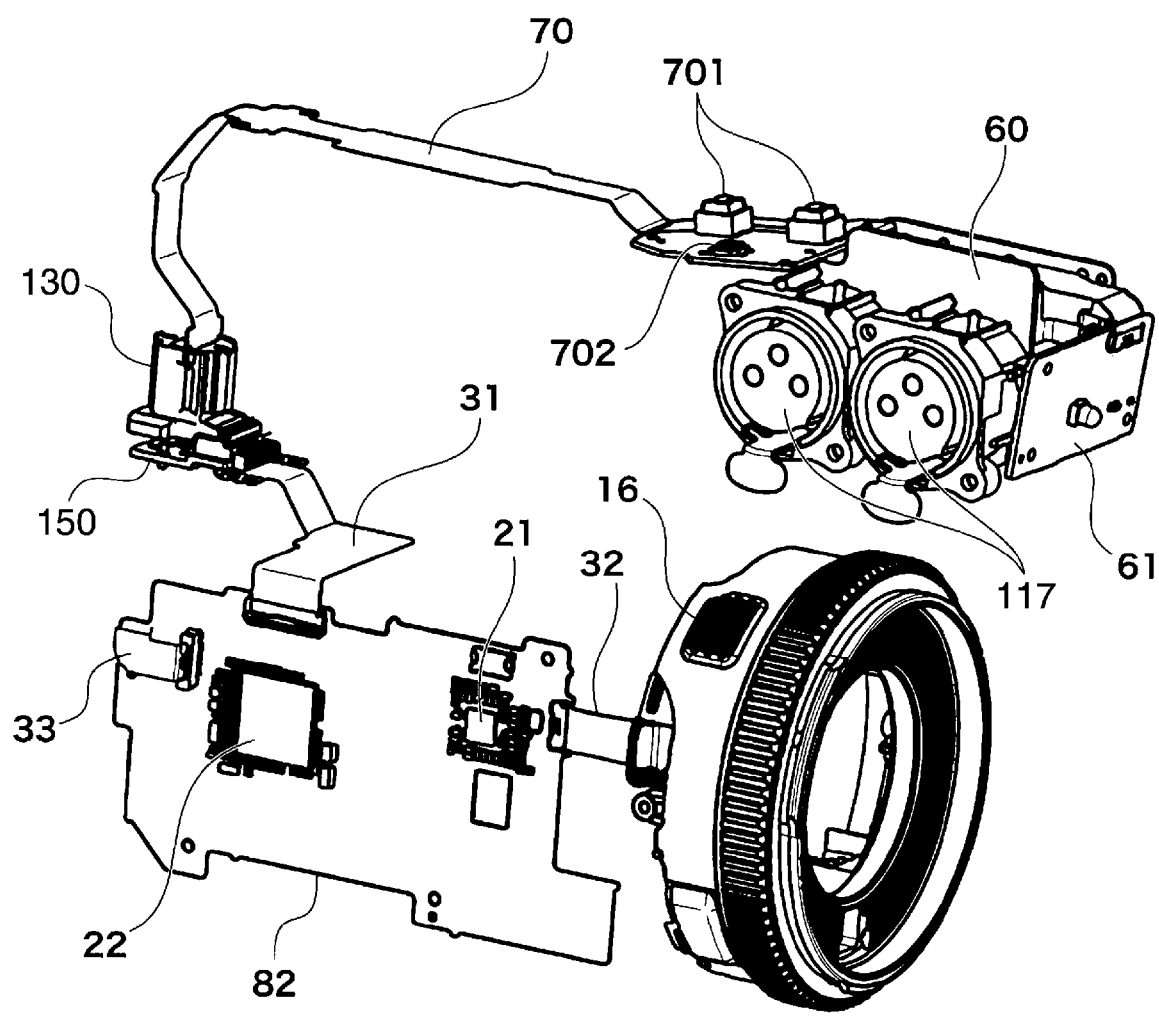
FIG. 12 is a perspective view of an internal structure of the digital video camera in a state in which an exterior member of the camera main unit, an exterior member of the handle unit, etc., are removed from the state shown in FIG. 10.

FIG. 12 is a perspective view of an internal structure of the digital video camera in a state in which an exterior member 12 of the main unit 100, an exterior member 51 of the handle unit 110, etc. are removed from the state shown in FIG. 10.

Referring to FIG. 12, a main substrate 82 performs signal processing, such as compression and processing of a picked-up image and an audio signal, processing of operation input and output signals, and recording and reading of a video signal. An audio block 21 and an operation-related block 22 are provided on the main substrate 82.

The audio block 21 amplifies a faint analog audio signal, such as sound input from the internal microphone 16 or an external microphone, and performs digital processing on the same. The operation-related block 22 processes input and signals from the zoom switch 14, the mode switch 15, and the operating section of the handle unit 110.

Further, the main unit-side connector 150 and the internal microphone 16 are electrically connected to the main substrate 82 via flexible printed substrates (hereinafter referred to as the FPC) 31 and 32. The zoom switch 14 and the mode switch 15 are also connected to the main substrate 82 via a FPC 33.

An FPC 70 has a handle zoom switch 701 and a handle trigger switch 702 mounted thereon, and is electrically connected to the handle-side connector 130. An external microphone substrate 60 has the external microphone connectors 117 mounted thereon, and a power substrate 61 supplies electric power to the FPC 70, the external microphone substrate 60, and so forth.

Figure 13:
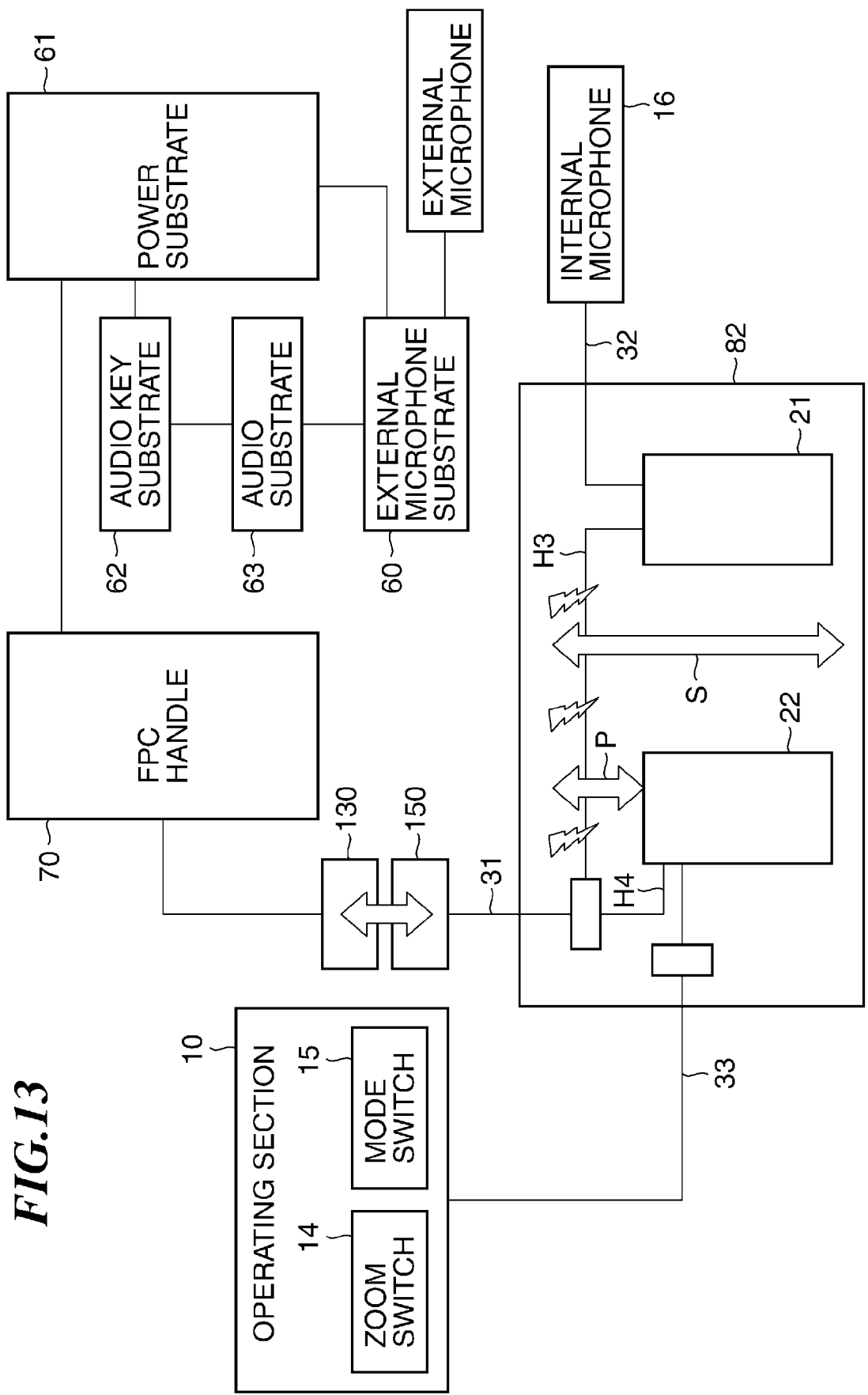
FIG. 13 is a schematic block diagram of an electrical system of the digital video camera shown in FIG. 10.

FIG. 13 is a schematic block diagram of an electrical system of the digital video camera shown in FIG. 10. As mentioned above, the external microphone substrate 60 has the external microphone connectors 117 mounted thereon, and receives an audio signal from the external microphone. At this time, the power substrate 61 generates a power signal for operating the external microphone based on a power signal received from the main substrate 82 via the FPC 70, and transmits the generated power signal to the external microphone substrate 60.

An audio key substrate 62 has an audio mode switch 621 for switching e.g. microphone channels and input modes of the microphone and a microphone sensitivity control knob 622, mounted thereon(see FIG. 17), and transmits operation signals from the audio mode switch 621 and the microphone sensitivity control knob 622 to an audio substrate 63. The audio substrate 63 processes and generates an audio signal input from the external microphone substrate 60 depending on manipulation of the microphone channel switch or the microphone sensitivity control knob. The audio signal generated by the audio substrate 63 is transmitted to the handle-side connector 130 via the power substrate 61 and the FPC 70.

Further, also when the handle zoom switch 701 and the handle trigger switch 702 mounted on the FPC 70 are manipulated, operation signals from these switches are sent from the FPC 70 to the handle-side connector 130. The operation signals from the handle unit 110, which have been sent to the handle-side connector 130, are transferred to the main substrate 82 via the main unit-side connector 150 and the FPC 31.

On the other hand, the main substrate 82 on the front portion of the main unit 100 is provided with the audio block 21 that performs e.g. analog-to-digital conversion processing on an audio signal. The audio signal from the internal microphone 16 is transmitted to the main substrate 82 via the FPC 32, and is sent to the audio block 21 for signal processing.

Further, operation signals from an operating section 10 including the zoom switch 14, the mode switch 15, and so forth, disposed on the main unit 100 are transmitted to the main substrate 82 via the FPC 33, and then are sent to the operation-related block 22 for signal processing.

By the way, as mentioned above, the operation signals and the audio signal sent from the handle unit 110 are transmitted to the main substrate 82 via the FPC 31. A pattern on the main substrate 82 is formed such that the operation signals are sent to the operation-related block 22 and the audio signal is sent to the audio block 21, for signal processing on the main substrate 82.

More specifically, as shown FIG. 13, the pattern on the main substrate 82 is formed such that the operation signals are sent to the operation-related block 22 through traces H4, and the audio signal is sent to the audio block 21 through a trace H3.

In association with the pattern on the main substrate 82, a signal receiving section for receiving signals from the handle unit 110 is disposed in an area of the main substrate 82 located in a rear portion of the main unit 100, and the audio block 21 is disposed in an area on the main substrate 82 located in a front portion of the main unit 100. Therefore, the trace H3 extends over a long distance from the area on the main substrate 82 located in the rear portion of the main unit 100 to the area on the main substrate 82 located in the front portion of the same.

Note that signals on the main substrate 82 include signals as noise sources to the audio signal line, such as PWM-controlled power signals for operating various ICs and drivers, a recording system signal, which is a high-load circuit signal that intermittently operates in an audible range in which video information is recorded and read.

Therefore, in the digital video camera as the image pickup apparatus according to the first embodiment of the present invention, the audio signal crosses over and passes near a power signal line P and a recording system signal line S as the noise sources when the audio signal is transmitted to the audio block 21 disposed in the area on the main substrate 82 located in the front portion of the main unit 100 through the trace H3. Therefore, the audio signal, which is a faint analog signal, may be affected by noise to suffer from degradation of signal quality.

Hereafter, a second embodiment of the present invention will be described hereinafter with reference to FIGS. 14 to 20. The second embodiment of the present invention improves the signal path in the digital video camera as the image pickup apparatus according to the first embodiment, which is provided with the removable handle unit which is small-sized, easy to be handled and removed, and free from breakage of electrical contacts.

Figure 14:
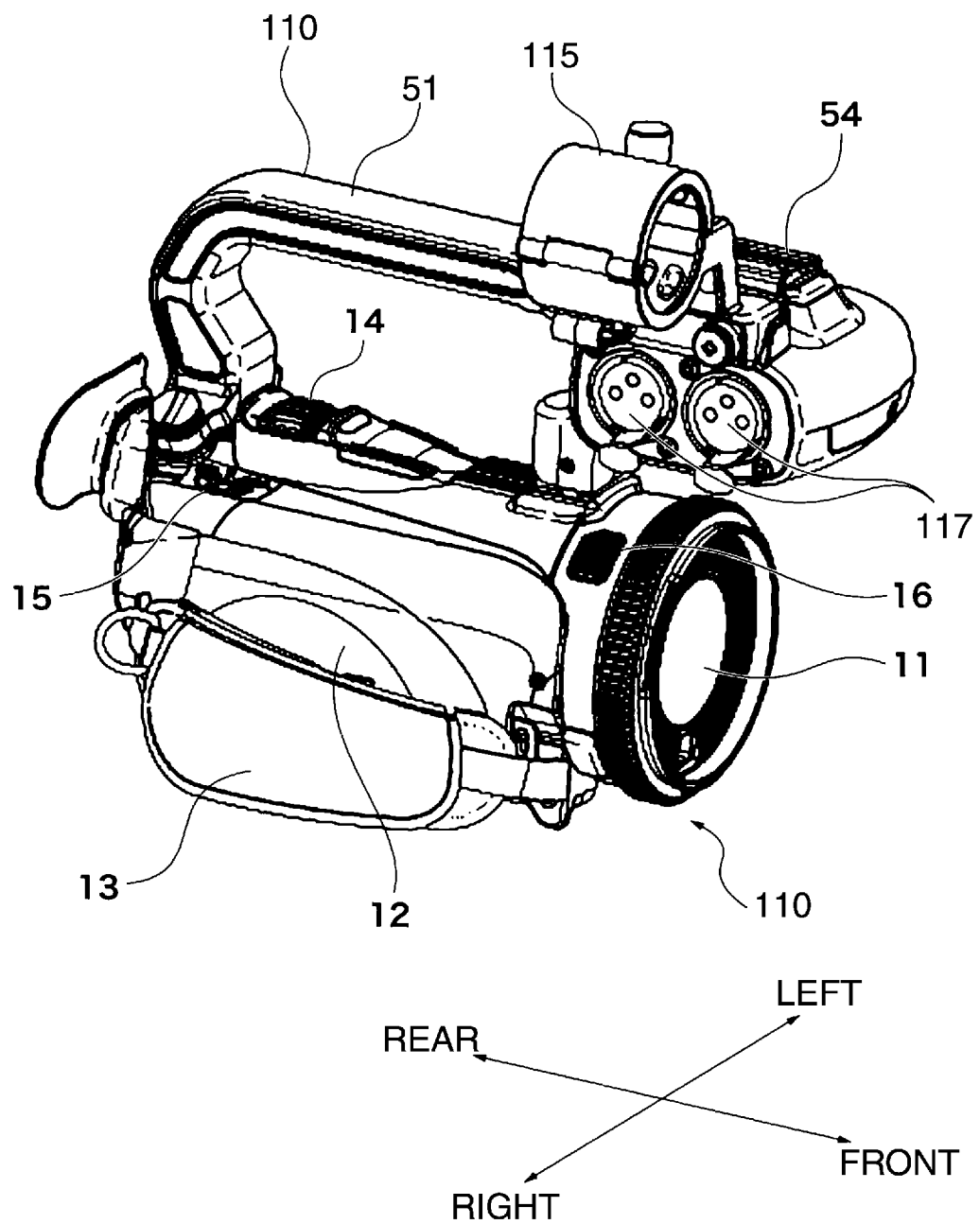
FIG. 14 is a perspective view of a digital video camera as an image pickup apparatus according to a second embodiment of the present invention.
Figure 15:
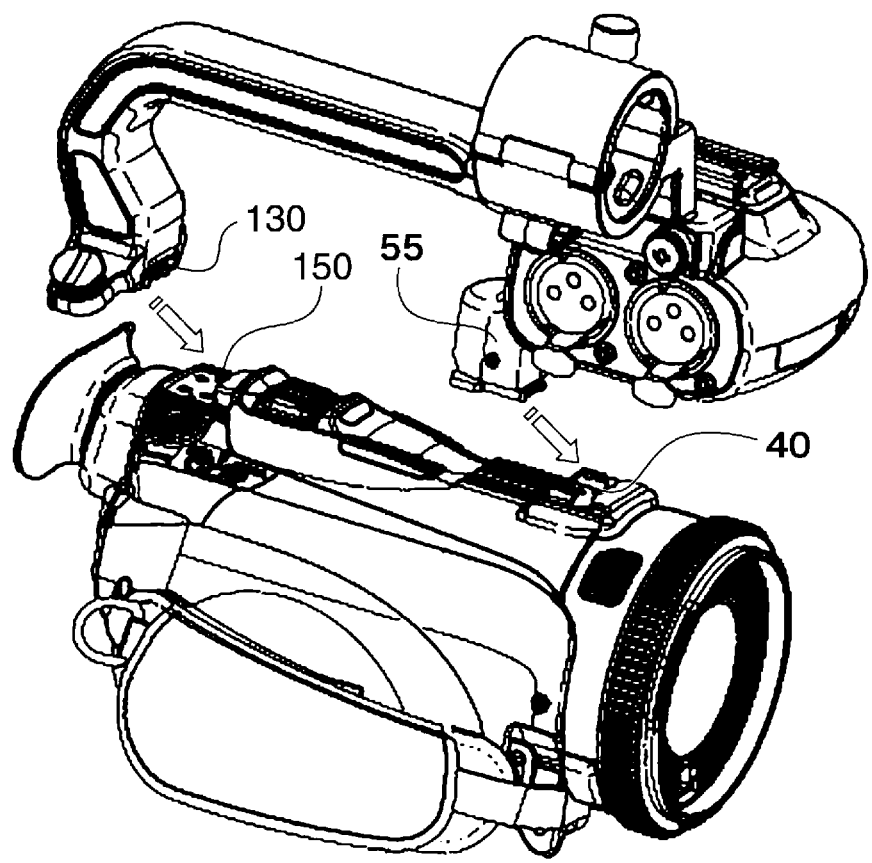
FIG. 15 is a perspective view of the digital video camera shown in FIG. 14 in a state in which a handle unit is removed from a camera main unit.

FIG. 14 is a perspective view of the digital video camera as the image pickup apparatus according to the second embodiment of the present invention, and FIG. 15 is a perspective view of the digital video camera shown in FIG. 14 in a state in which the handle unit is removed from the camera main unit. Members corresponding to those of the first embodiment are denoted by the same reference numerals.

In the digital video camera according to the present embodiment, front-rear and horizontal directions are defined as illustrated in FIG. 14. Therefore, the photographic lens 11 is disposed in the front portion of the main unit 100, and the grip belt 13 is disposed on the right side of the main unit 100. The zoom switch 14, the mode switch 15, and the internal microphone 16 are disposed in the upper portion of the main unit 100. Note that the main unit 100 corresponds to an apparatus main unit of the present invention.

Further, the handle unit 110 is mounted to the upper portion of the main unit 100 in a removable manner. The external microphone holder 115, the external microphone connectors 117 which are electrically connected to an external microphone removably mounted to the external microphone holder 115, and the accessory mount 54 are disposed in the front portion of the handle unit 110. The external microphone corresponds to a handle-side microphone of the present invention.

When the shooting operation is performed in a state of the digital image camera in which the main unit 100 is held by a photographer with his/her right hand passing inside the grip belt 13, the photographer's right forefinger is placed in a position where the zoom switch 14 and the mode switch 15 can be operated, with his/her right forefinger. Further, the photographer's right thumb is placed in a position where a trigger switch, not shown, on a rear side of the main unit 100 can be operated with his/her right thumb.

As described above, the switches used for shooting are required to be operable with a hand that holds the main unit 100, and hence the switches are disposed on the rear side and the rear portion of the main unit 100. The zoom switch 14, the mode switch 15, and the trigger switch, not shown, correspond to a main unit-side operating section of the present invention.

On the other hand, the internal microphone 16 is located on the front portion of the main unit 100 which is closer to an object in order to input sound made by the object in a good condition, and further, in order to prevent input of noise caused by touching the internal microphone 16 with the hand holding the main unit 100.

Further, when the photographer holds the handle unit 110 with the right hand to perform shooting, the photographer's right thumb is placed in a position where the handle zoom switch 701 and the handle trigger switch 702 (see FIG. 16) can be operated with his/her right thumb, which are disposed on the upper surface of the handle unit 110. The handle zoom switch 701 and the handle trigger switch 702 correspond to a handle-side operating section of the present invention.

When an external microphone is used, the external microphone is mounted to the external microphone holder 115, and output terminals of the external microphone are inserted in the external microphone connectors 117 to thereby electrically connect the external microphone and the main unit 100. To input sound made by an object in a good condition, the external microphone holder 115 and the external microphone connectors 117 are disposed in the front portion of the handle unit 110 closer to the object.

Further, as shown in FIG. 15, the upper portion of the main unit 100 is provided with a main unit-side connector 40 located on the front portion thereof and the main unit-side connector 150 located on the rear portion thereof.

Further, the handle unit 110 is provided with a handle-side connector 55 and the handle-side connector 130. The main unit-side connector 40 corresponds to a first main unit-side contact portion of the present invention, and the main unit-side connector 150 corresponds to a second main unit-side contact portion of the present invention. Further, the handle-side connector 55 corresponds to a first handle-side contact portion of the present invention, and the handle-side connector 130 corresponds to a second handle-side contact portion of the present invention.

To mount the handle unit 110 to the main unit 100 from the state shown in FIG. 15, the handle unit 110 is slid in a direction indicated by an arrow in FIG. 15, and is mounted.

At this time, the handle-side connector 55 is engaged with the main unit-side connector 40, whereby the main unit-side connector 40 and the handle-side connector 55 are electrically connected to each other. The handle-side connector 130 is engaged with the main unit-side connector 150, whereby the main unit-side connector 150 and the handle-side connector 130 are electrically connected to each other. That is, the main unit 100 and the handle unit 110 are electrically connected via respective two portions i.e. the front portion and the rear of the main unit 100.

Incidentally, if the number of electrical functions required for the handle unit 110 (e.g. a video light LED, an infrared light irradiation LED, etc.) increases, the number of electrical contacts required to be provided in the handle unit 110 increases. On the other hand, the electrical contacts in the removable handle unit 110 are required to have a pitch which is not shorter than a predetermined distance in order to ensure contact reliability.

Therefore, if the number of pins of the electrical contacts is simply increased, the size of the handle unit 110 is increased. In the present embodiment, a plurality of contact portions are provided on the handle unit 110, and by assigning a necessary number of pins to each of the plurality of contact portions, it is possible to meet the requirement of increasing the number of electrical functions of the handle unit 110 without increasing the size of the handle unit 110.

Although in the present embodiment, two electrical contact portions are provided on the main unit 100 and the handle unit 110, respectively, three or more electrical contact portions may be provided.

Figure 16:
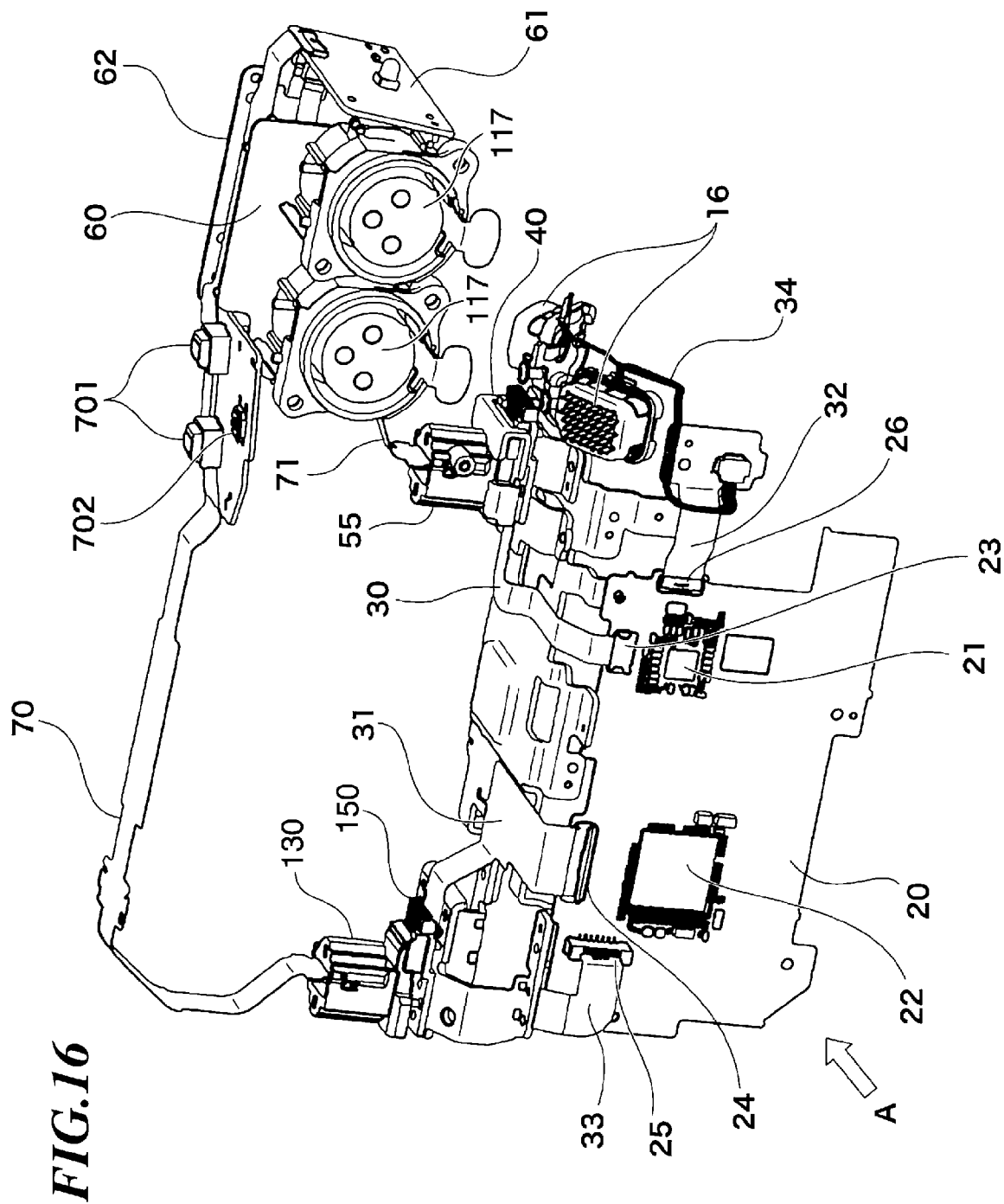
FIG. 16 is a perspective view of an internal structure of the digital video camera in a state in which an exterior member of the camera main unit, an exterior member of the handle unit, etc., are removed from the state shown in FIG. 14.

FIG. 16 is a perspective view showing an internal structure of the digital video camera in a state in which the exterior member 12 of the main unit 100, the exterior member 51 of the handle unit 110, etc. are removed from the state shown in FIG. 14.

In FIG. 16, a main substrate 20 is disposed within the main unit 100, and performs signal processing, such as compression and processing of a picked-up image and an audio signal, processing of an operation input and output signals, and recording and reading of a video signal. The audio block 21 and the operation-related block 22 are provided on the main substrate 20.

The audio block 21 amplifies a micro analog audio signal, such as sounds input from the internal microphone 16 or an external microphone, and performs digital processing on the same. The operation-related block 22 processes input and output signals from the zoom switch 14, the mode switch 15, and the operating section of the handle unit 110. The audio block 21 corresponds to an audio signal processor of the present invention, and the operation-related block 22 corresponds to an operation-related signal processor.

Further, the main substrate 20 has a front connector 23, a rear connector 24, an operation-related connector 25, and an internal microphone connector 26 mounted thereon. The front connector 23 and the main unit-side connector 40 are electrically connected to each other via an FPC 30, and the rear connector 24 and the main unit-side connector 150 are electrically connected to each other via the FPC 31.

The FPC 32 is connected to an internal microphone wire 34 connected to the internal microphone 16 to thereby transmit an audio signal to the main substrate 20 through the internal microphone connector 26. The FPC 33 is connected to the operation-related connector 25 to thereby electrically connect the zoom switch 14 and the mode switch 15 to the main substrate 20.

The FPC 70 has the handle zoom switch 701 and the handle trigger switch 702 mounted thereon, and is electrically connected to the handle-side connector 130. An FPC 71 is electrically connected to the handle-side connector 55. The external microphone substrate 60 has the external microphone connectors 117 mounted thereon, and the power substrate 61 supplies electric power to the FPC 70, the external microphone substrate 60, and so forth.

Figure 17:
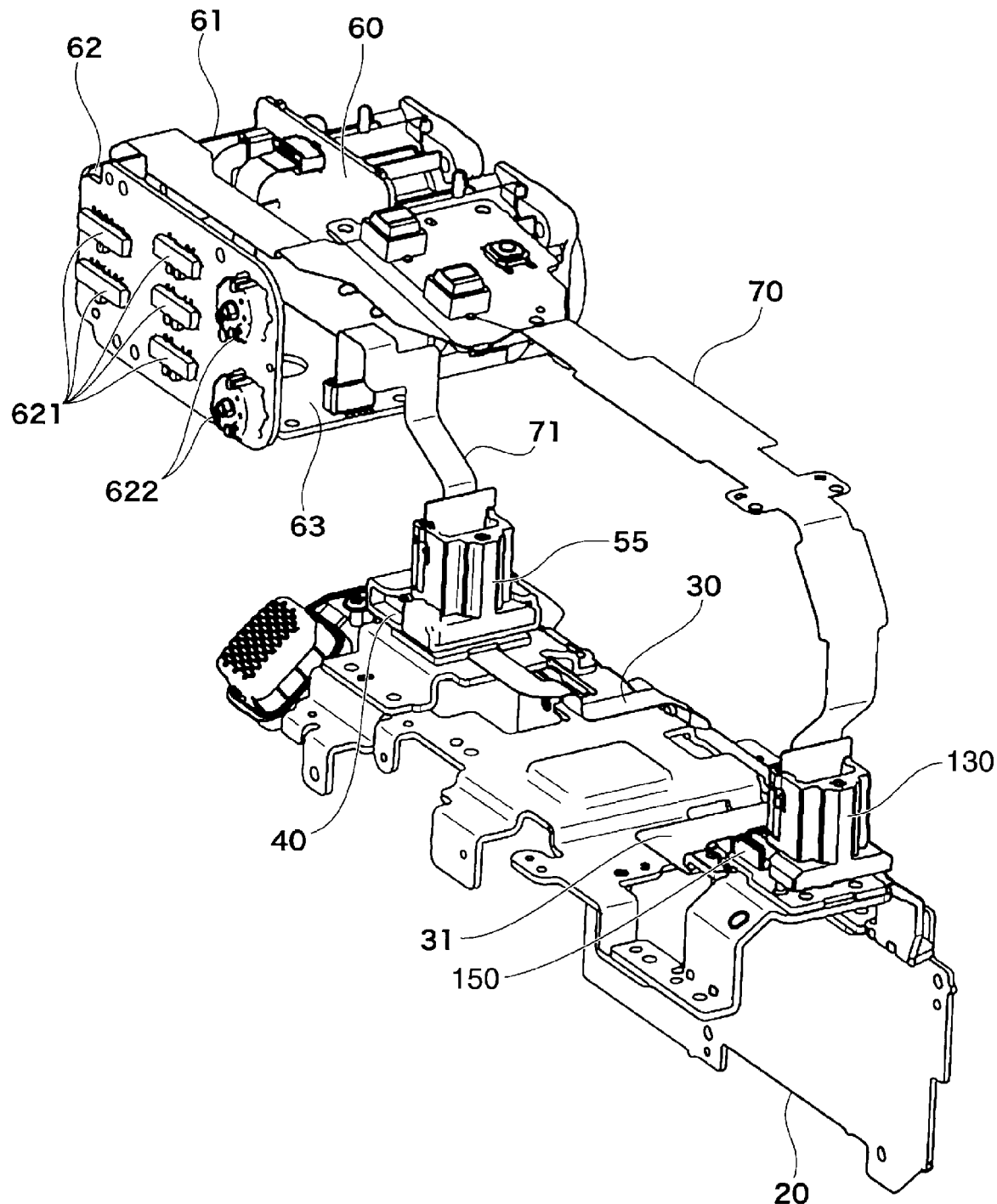
FIG. 17 is a perspective view of the digital video camera in the state shown in FIG. 16, as viewed from the rear.

FIG. 17 is a perspective view of the internal structure of the digital video camera in the state shown in FIG. 16, as viewed from the rear. In FIG. 17, as mentioned hereinabove, the audio key substrate 62 has the audio mode switch 621 for switching channels and input modes of the microphone and the microphone sensitivity control knob 622, mounted thereon. The audio substrate 63 processes and generates the audio signal input from the external microphone substrate 60, and is electrically connected to the handle-side connector 55 via the FPC 71.

Figure 18:
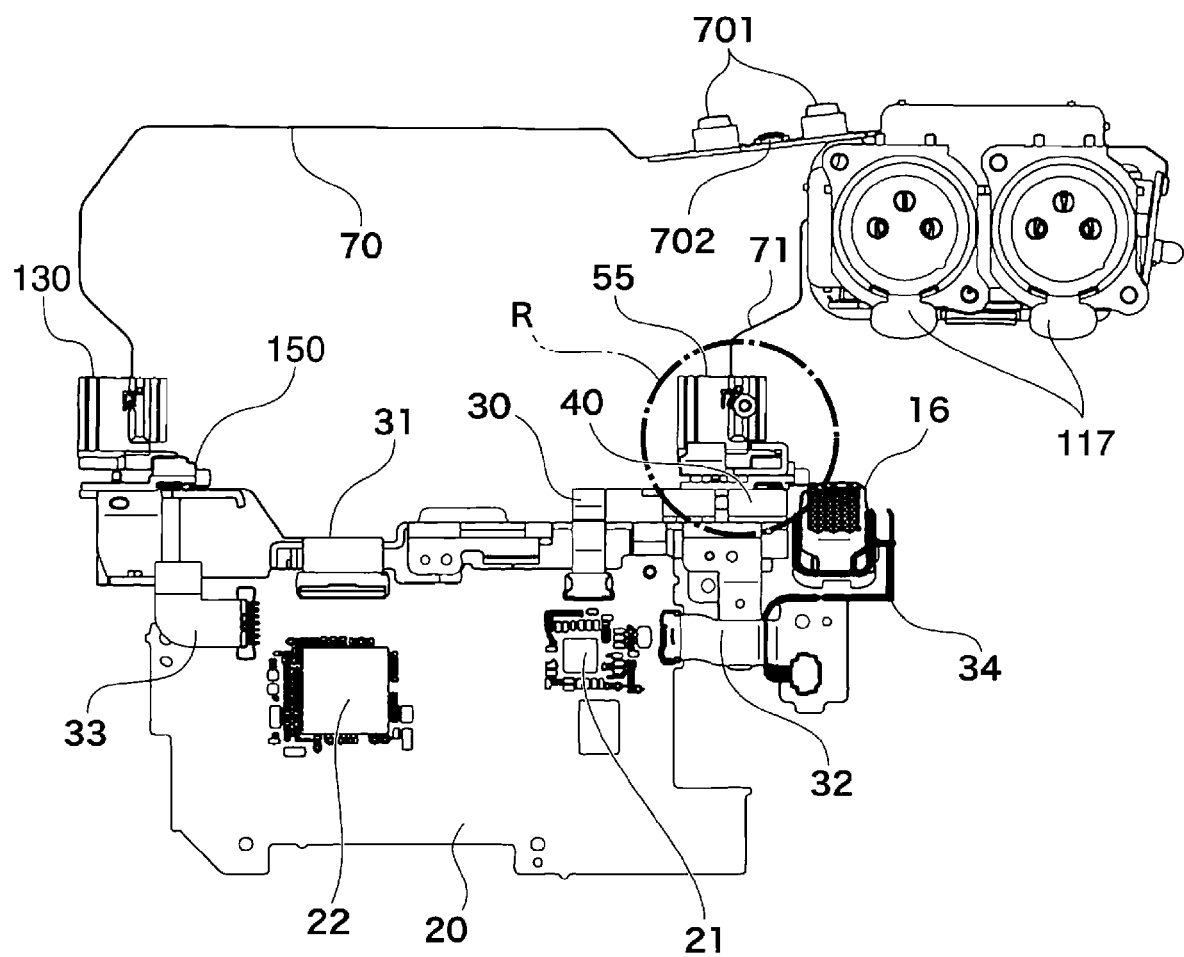
FIG. 18 is a view of the digital video camera in the state in FIG. 16, as viewed from a direction indicated by an arrow A in FIG. 16.
Figure 19:
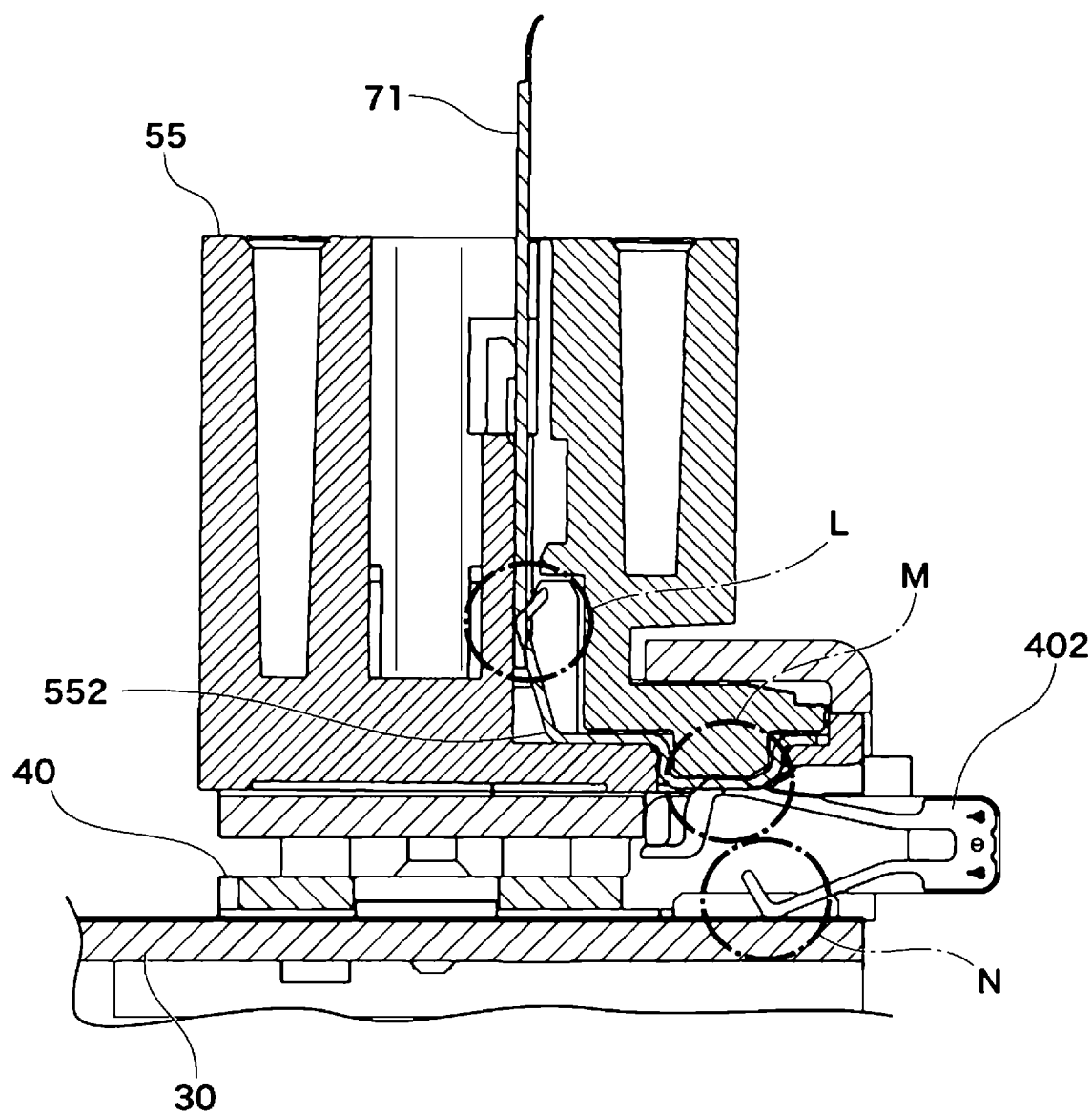
FIG. 19 is an enlarged cross-sectional view of R part in FIG. 18.

FIG. 18 is a view of the internal structure of the digital video camera in the state shown in FIG. 16, as viewed from a direction indicated by an arrow A in FIG. 16, and FIG. 19 is an enlarged cross-sectional view of R part in FIG. 18. Referring to FIGS. 18 and 19, a contact 552 of the handle-side connector 55 and a contact 402 of the main unit-side connector 40 are both formed of e.g. a metal having an electrical conductivity and a spring property. The contacts 552 and 402 are each provided in plurality and arranged in a direction of a depth which is orthogonal to the sheet of FIG. 19.

The contacts 552 of the handle-side connector 55 are in contact with respective associated copper foil portions of the FPC 71 in an urged state, which is inserted in a slit of the handle-side connector 55 disposed in the front portion of the main unit 100, and are electrically connected thereto (L part in FIG. 19). The contacts 402 of the main unit-side connector 40 are in contact with respective associated planar portions of the contacts 552 of the handle-side connector 55 in an urged state and are electrically connected to (M part in FIG. 19). Further, the contacts 402 are in contact with respective associated copper foil portions of the FPC 30 in an urged state and are electrically connected thereto (N part in FIG. 19).

With this arrangement, the FPC 71 and the FPC 30 are connected to each other via the handle-side connector 55 and the main unit-side connector 40. As for the handle-side connector 130 and the main unit-side connector 150 on the rear portion of the main unit 100, similarly to the above, the FPC 70 and the FPC 31 are connected to each other via the handle-side connector 130 and the main unit-side connector 150.

Figure 20:
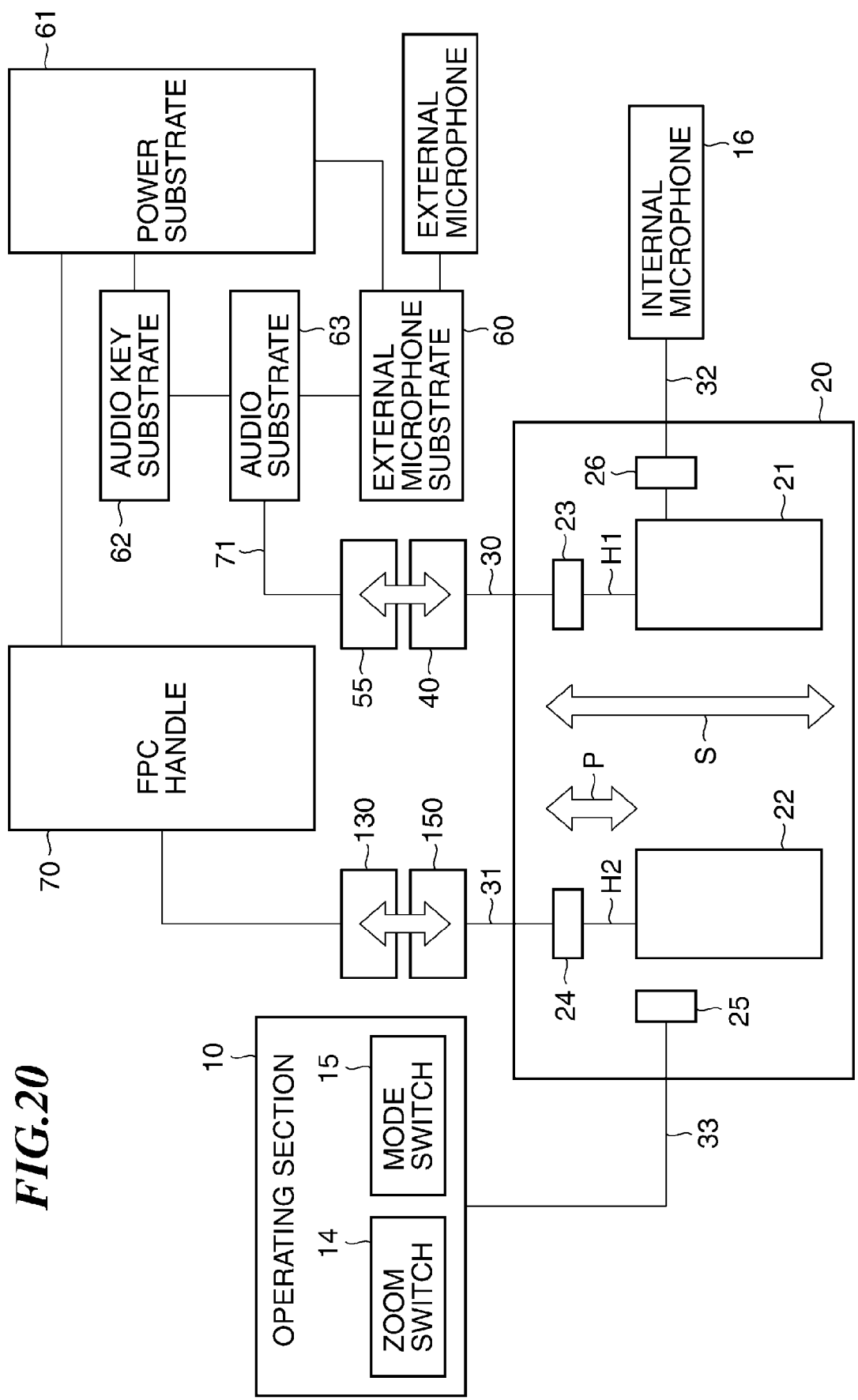
FIG. 20 is a schematic block diagram of an electric system of the digital video camera.

FIG. 20 is a schematic block diagram of an electrical system of the digital video camera. As mentioned above, the external microphone substrate 60 has the external microphone connectors 117 mounted thereon, and receives the audio signal from the external microphone. At this time, the power substrate 61 generates a power signal for operating the external microphone based on a power signal supplied from the main substrate 20 via the FPC 70, and transmits the generated power signal to the external microphone substrate 60.

The audio key substrate 62 has the audio mode switch 621 and the microphone sensitivity control knob 622, mounted thereon, and transfers operation signals therefrom the audio substrate 63.

The audio substrate 63 processes and generates the audio signal input from the external microphone substrate 60 depending on manipulation of the audio mode switch 621, the microphone sensitivity control knob 622, and so forth. The audio signal generated by the audio substrate 63 is output to the handle-side connector 55 via the FPC 71, and is transferred to the audio block 21 of the main substrate 20 via the main unit-side connector 40 and the FPC 30.

Further, the operation signals from the handle zoom switch 701 and the handle trigger switch 702 mounted on the FPC 70 are output from the FPC 70 to the handle-side connector 130, and are transferred to the operation-related block 22 of the main substrate 20 via the main unit-side connector 150 and the FPC 31.

As described above, the audio signal input from the external microphone is sent to the area on the main substrate 20 located in the front portion of the main unit 100, and the operation signals, the power signal, and the like are sent to the area on the main substrate 20 located in the rear portion of the main unit 100.

On the other hand, the audio block 21 which performs analog-to-digital conversion and like other processing on the audio signal is disposed in the area on the main substrate 20 located in the front portion of the main unit 100. The audio signal from the internal microphone 16 is transmitted to the main substrate 20 via the FPC 32, and is sent to the audio block 21 for signal processing.

Note that the audio signal from the internal microphone 16 is an analog faint signal susceptible to noise. Therefore, to prevent the audio signal from the internal microphone 16 from being degraded, it is preferable to make as short as possible the distance between the internal microphone connector 26 as an input of the audio signal to the main substrate 20 and the audio block 21 which are connected by the pattern.

Further, the operation signals from the operating section 10 including the zoom switch 14 and the mode switch 15 disposed on the main unit 100 are transmitted to the main substrate 20 via the FPC 33, and then are sent to the operation-related block 22 for signal processing. The operating section 10 including the zoom switch 14 and the mode switch 15 is located in the rear portion of the main unit 100 so as to make it easy for the photographer to operate the operating section during shooting.

For this reason, it is preferable to dispose the operation-related block 22 in the area on the main substrate 20 located in the rear portion of the main unit 100. By disposing the operation-related block 22 in the area on the main substrate 20 located in the rear portion of the main unit 100, it is not only possible to reduce the length of the FPC 33 to thereby reduce the costs, but also possible to reduce the length of the pattern on the main substrate 20, which makes it possible to contribute to size reduction of the main substrate 20.

Next, a description will be given of processing of an electrical signal delivered from the handle unit 110 to the main substrate 20.

First, the audio signal sent from the external microphone of the handle unit 110 to the main substrate 20 is transmitted to the audio block 21 of the main substrate 20 through connection between the FPC 71 and the FPC 30 by the main unit-side connector 40 on the front portion of the main unit 100 and the handle-side connector 55.

The FPC 30 is connected to the front connector 23 mounted on the main substrate 20, and the audio signal input to the front connector 23 is input to the audio block 21 through a trace H1 appearing in FIG. 20 for signal processing by the main substrate 20.

As shown in FIG. 20, the front connector 23 and the audio block 21 are both disposed in the area on the main substrate 20 located in the front portion of the main unit 100, and hence the trace H1 extends over a very short distance.

This makes it possible to perform signal processing on the audio signal input from the external microphone of the handle unit 110 without being affected e.g. by the power line P or the recording system signal line S shown in FIG. 20 as noise sources on the main substrate 20. Further, since it is possible to reduce the length of the trace H1 on the main substrate 20, it is possible to reduce the size of the outer shape of the main substrate 20, and reduce the size and costs of the digital video camera.

On the other hand, the operation signals sent from the operating section of the handle unit 110 to the main substrate 20 are transmitted to the operation-related block 22 of the main substrate 20 through connection between the FPC 70 and the FPC 31 by the main unit-side connector 150 in the rear portion of the main unit 100 and the handle-side connector 130.

The rear FPC 31 is connected to the rear connector 24 mounted on the main substrate 20, and an operation signal input to the rear connector 24 is input to the operation-related block 22 though a trace H2 appearing in FIG. 20, for signal processing on the main substrate 20.

As shown in FIG. 20, the rear connector 24 and the operation-related block 22 are both disposed in the area on the main substrate 20 located in the rear portion of the main unit 100, and hence the pattern H2 extends over a very short distance. This makes it possible to reduce the size of the outer shape of the main substrate 20, and reduce the size and costs of the digital video camera.

As described heretofore, in the present embodiment, in the digital video camera that includes the handle unit 110 which can be mounted and removed to and from the main unit 100, and has electrical contacts on the handle unit 110, it is possible to prevent an audio signal sent from the handle unit 110 from being degraded. Further, in the present embodiment, it is possible to reduce the size of the outer shape of the main substrate 20, and hence it is possible to reduce the size and costs of the digital video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Further, the embodiments of the present invention are described only by way of example, and it is possible to combine the embodiments on an as needed basis.

For example, although in the above-described embodiments, the handle unit 110 is fixed to the main unit 100 via two portions, i.e. the front and rear portions, the handle unit may be fixed to the main unit 100 via only one portion. In this case, the structure of the rear portion of the handle unit 110 described in the embodiments is applied to the structure of the one fixing portion. Further, although in the above-described embodiments, the handle unit 110 is mounted and fixed to the main unit 100 with the two rear handle fixing members 120, the fixing structure is not limited to that having the rear handle fixing members 120 at two locations, but for example, the two rear handle fixing members 120 may be each provided at two locations, i.e. a total of four rear handle fixing members 120 may be provided.

This application claims the benefit of Japanese Patent Application No. 2010-285878, filed Dec. 22, 2010, Japanese Patent Application No. 2011-214390, filed Sep. 29, 2011, which are hereby incorporated by reference herein in their entirety.

What is claimed is:

1. An image pickup apparatus including a main unit, and a handle unit which can be mounted and removed to and from the main unit,
   wherein the handle unit comprises:
   a handle-side connector having a first terminal section for electrically connecting the handle unit and the main unit;
   a first fixing member for mounting the handle unit to the main unit;
   a second fixing member for mounting the handle-side connector to the handle unit; and
   a resilient member that is interposed between the handle-side connector and the second fixing member, and
   wherein the main unit comprises:
   a main unit-side connector having a second terminal section which is electrically connected to said first terminal section of said handle-side connector; and
   a main unit-side fixing portion to which said first fixing member is affixed, and
   wherein said handle-side connector and said main unit-side connector are connected such that said first terminal section and said second terminal section are electrically connected in a state in which said first fixing member is affixed to said main unit-side fixing portion.

2. The image pickup apparatus according to claim 1, wherein by affixing said first fixing members to said main unit-side fixing portion, said handle-side connector is pressed against said main unit-side connector by said resilient member, in a state where said handle-side connector is connected to said main unit-side connector.

3. The image pickup apparatus according to claim 1, wherein the handle unit further comprises:
   an input-output terminal to which at least one of an operating section for operating the main unit and an accessory is attached, and
   a signal transmitting section that is provided within a frame of the handle unit, for transmitting or receiving an electrical signal between the at least one of the operating section and the input-output terminal and the main unit, and electrically connects the at least one of the operating section and the input-output terminal and said first terminal section included in said handle-side connector.

4. The image pickup apparatus according to claim 1, wherein said handle-side connector has a screw hole into which a shoulder screw is screwed, wherein said resilient member and said second fixing member have respective holes through which the shoulder screw is inserted, and wherein the shoulder screw is inserted through the holes respectively formed in said resilient members and said second fixing member, and is screwed into the screw hole formed in said handle-side connector, whereby said handle-side connector is affixed to said second fixing member.

5. The image pickup apparatus according to claim 1, wherein the handle unit has a plurality of said second fixing members, and wherein said handle-side connector is disposed between said plurality of first fixing members in a state in which the handle unit is fixed to the main unit.

6. The image pickup apparatus according to claim 5, wherein said first terminal section included in said handle-side connector is disposed at a location on a straight line connecting the plurality of said first fixing members, in a state in which the handle unit is fixed to the main unit.

\* \* \* \* \*